United States Patent
Duchscher et al.

(10) Patent No.: US 8,169,938 B2
(45) Date of Patent: May 1, 2012

(54) COMMUNICATION SYSTEM FOR WIRELESS AUDIO DEVICES

(75) Inventors: Rob Duchscher, Rosemount, MN (US); David A. Preves, Chanhassen, MN (US); Thomas A. Victorian, Plymouth, MN (US); Jeffrey Paul Solum, Deephaven, MN (US); Randy L. Magstadt, Maple Grove, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 1108 days.

(21) Appl. No.: 11/447,617

(22) Filed: Jun. 5, 2006

(65) Prior Publication Data

US 2006/0274747 A1    Dec. 7, 2006

Related U.S. Application Data

(60) Provisional application No. 60/687,707, filed on Jun. 5, 2005.

(51) Int. Cl.
*H04B 7/00* (2006.01)
*H04R 5/00* (2006.01)
*H04R 25/00* (2006.01)

(52) U.S. Cl. ....... 370/310; 381/23.1; 381/312; 381/315; 381/314; 600/25

(58) Field of Classification Search .............. 381/23.1, 381/312, 315, 314; 600/25
See application file for complete search history.

(56) References Cited

U.S. PATENT DOCUMENTS

| | | | |
|---|---|---|---|
| 5,083,312 A | 1/1992 | Newton et al. | |
| 5,966,639 A | 10/1999 | Goldberg et al. | |
| 6,088,339 A * | 7/2000 | Meyer | 370/296 |
| 6,633,645 B2 | 10/2003 | Bren et al. | |
| 6,694,034 B2 * | 2/2004 | Julstrom et al. | 381/315 |
| 6,760,457 B1 | 7/2004 | Bren et al. | |
| 7,062,223 B2 | 6/2006 | Gerber et al. | |
| 7,075,903 B1 | 7/2006 | Solum | |
| 7,412,294 B1 * | 8/2008 | Woolfork | 700/94 |
| 7,529,565 B2 | 5/2009 | Hilpisch et al. | |
| 7,702,121 B2 | 4/2010 | Husung et al. | |
| 2002/0030871 A1 * | 3/2002 | Anderson et al. | 359/150 |
| 2003/0059073 A1 | 3/2003 | Bren et al. | |
| 2003/0215106 A1 | 11/2003 | Hagen et al. | |
| 2004/0052391 A1 | 3/2004 | Bren et al. | |
| 2005/0100182 A1 * | 5/2005 | Sykes et al. | 381/315 |
| 2008/0260180 A1 | 10/2008 | Goldstien et al. | |
| 2011/0090837 A1 | 4/2011 | Duchscher et al. | |

(Continued)

FOREIGN PATENT DOCUMENTS

CN    1191060 A    8/1998

(Continued)

OTHER PUBLICATIONS

"International Search Report for corresponding PCT Application No. PCT/US2006/021870", (Nov. 3, 2006), 4 pgs.
"European Application Serial No. 06772250.4, Office Action mailed Dec. 22, 2010", 3 Pgs.

(Continued)

*Primary Examiner* — Marivelisse Santiago Cordero
(74) *Attorney, Agent, or Firm* — Schwegman, Lundberg, & Woessner, P.A.

(57) ABSTRACT

The present subject matter provides a system for wireless communications between one or more wireless audio devices and other electronics for providing a rich set of streaming audio, control, programming and enhanced hearing functions.

27 Claims, 15 Drawing Sheets

U.S. PATENT DOCUMENTS

| | | |
|---|---|---|
| 2011/0150251 A1 | 6/2011 | Solum et al. |
| 2011/0150252 A1 | 6/2011 | Solum et al. |
| 2011/0150254 A1 | 6/2011 | Solum et al. |
| 2011/0249836 A1 | 10/2011 | Solum et al. |
| 2011/0249842 A1 | 10/2011 | Solum et al. |

FOREIGN PATENT DOCUMENTS

| | | | |
|---|---|---|---|
| EP | 1185138 | A2 * | 3/2002 |
| EP | 1519625 | A2 | 3/2005 |
| EP | 2012557 | A2 | 1/2009 |
| WO | WO-96/41498 | A1 | 12/1996 |
| WO | WO-9641498 | A1 | 12/1996 |
| WO | WO-02/09363 | A2 | 1/2002 |
| WO | WO-2005/101731 | A2 | 10/2005 |
| WO | WO-2006/133158 | A1 | 12/2006 |
| WO | WO-2009076949 | A1 | 6/2009 |

OTHER PUBLICATIONS

"International Application Serial No. PCT/US2006/021870, International Preliminary Report on Patentability mailed Nov. 3, 2006", 13 pgs.

"U.S. Appl. No. 12/980,696, Non-Final Office Action mailed", 7 pgs, Dec. 29, 2010.

"Chinese Application Serial No. 2,609,979, Response filed Aug. 16, 2011 to Office Action mailed Apr. 12, 2011", 15 pgs.

"Chinese Application Serial No. 200680028085.8, Office Action mailed Apr. 12, 2011", 3 pgs.

"Chinese Application Serial No. 2006800280.8, Office Action mailed Sep. 30, 2011", 8 pgs.

"European Application Serial No. 06772250.4, Response filed Jun. 24, 2011 to Office Action mailed Dec. 22, 2010", 18 pgs.

"European Application Serial No. 11250442.8, Extended European Search Report mailed Aug. 18, 2011", 6 pgs.

* cited by examiner

US 8,169,938 B2

COMMUNICATION SYSTEM FOR WIRELESS AUDIO DEVICES

RELATED APPLICATION

This application claims the benefit under 35 U.S.C. 119(e) of U.S. Provisional Application Ser. No. 60/687,707 filed Jun. 5, 2005, which application is incorporated herein by reference.

FIELD OF THE INVENTION

The present subject matter relates generally to wireless communications and more particularly to wireless communication systems for wireless audio devices.

BACKGROUND

Audio devices for listening to sound are becoming more diverse and prolific with time. Audio device manufacturers find new technologies and applications which enable new solutions and designs. In an effort to make audio devices more portable, manufacturers are becoming increasingly interested in producing wireless devices. New forms of content and communication arise which provide opportunities and engineering hurdles for manufacturers.

What is needed in the art is a system for communication with wireless audio devices. Such a system should be flexible to provide enhanced features. The system should be configurable for a variety of content and communications options.

SUMMARY

The above-mentioned problems and others not expressly discussed herein are addressed by the present subject matter and will be understood by reading and studying this specification.

The present subject matter provides a system for wireless communications between one or more wireless audio devices and other electronics for providing a rich set of streaming audio, control, programming and enhanced hearing functions. In one application, the present system provides highly programmable and intelligent communications to hearing assistance devices, such as hearing aids. Mono and stereo communication modes are supported in various embodiments. Unicast, multicast and broadcast communication modes are also supported in some embodiments. Several approaches are provided and the examples set forth herein are not intended to be limiting or exclusive.

This Summary is an overview of some of the teachings of the present application and not intended to be an exclusive or exhaustive treatment of the present subject matter. Further details about the present subject matter are found in the detailed description and appended claims. The scope of the present invention is defined by the appended claims and their legal equivalents.

DETAILED DESCRIPTION

The following detailed description of the present invention refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment. The following detailed description is demonstrative and therefore and not exhaustive, and the scope of the present subject matter is defined by the appended claims and their legal equivalents.

Figure 1A:
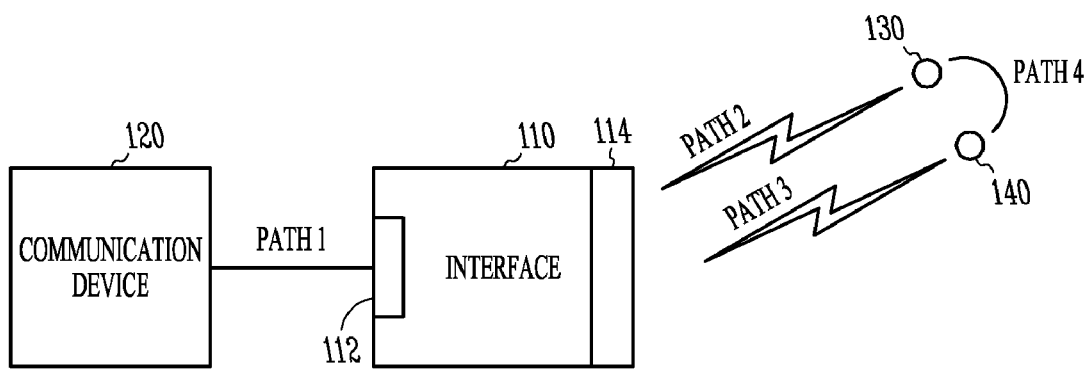
FIGS. 1A, 1B, and 1C demonstrate an interface between a communication device and one or more wireless audio devices, according to some embodiments of the present subject matter.
Figure 1B:
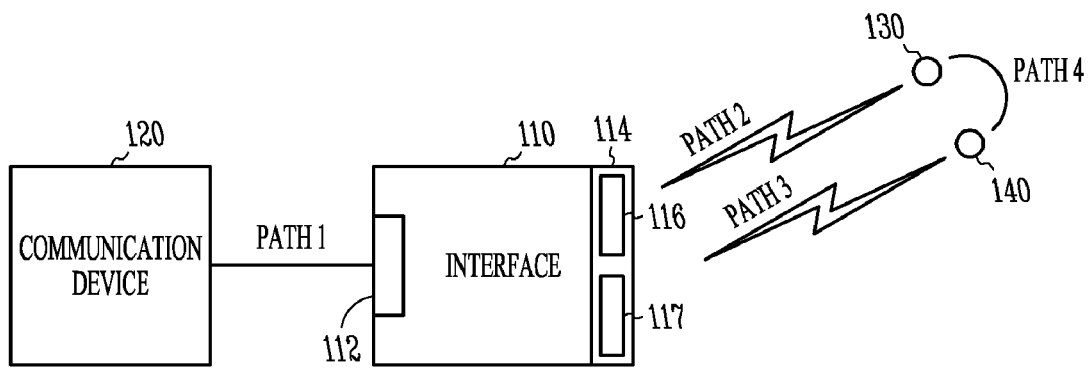

FIG. 1A shows one embodiment of a communication system 100 for wireless audio devices. In one embodiment, the system includes an interface 110 which provides communications from a communication device 120 to a first port 112 and communications from a second port 114 to a wireless audio device 130. In various embodiments, the system 100 also provides communications to a wireless audio device 140. Some such embodiments include a single wireless interface to perform communications to wireless audio devices 130 and 140. Other such embodiments have second port 114 incorporate at least two wireless interfaces 116 and 117, as shown in FIG. 1B. For ease of explanation, this disclosure will show second port 114, however, it is understood that different embodiments of interface 10 will have a second port 114 that may have one, two, or more wireless interfaces. In packet systems, the effective number of virtual interfaces is set by the coding scheme. In such designs, the physical second interface may employ the same transmitter. Varying embodiments may use a plurality of transmitters. It is understood that various embodiments of interface 110 may also include programmable ports to adapt to different communication applications.

Figure 1C:
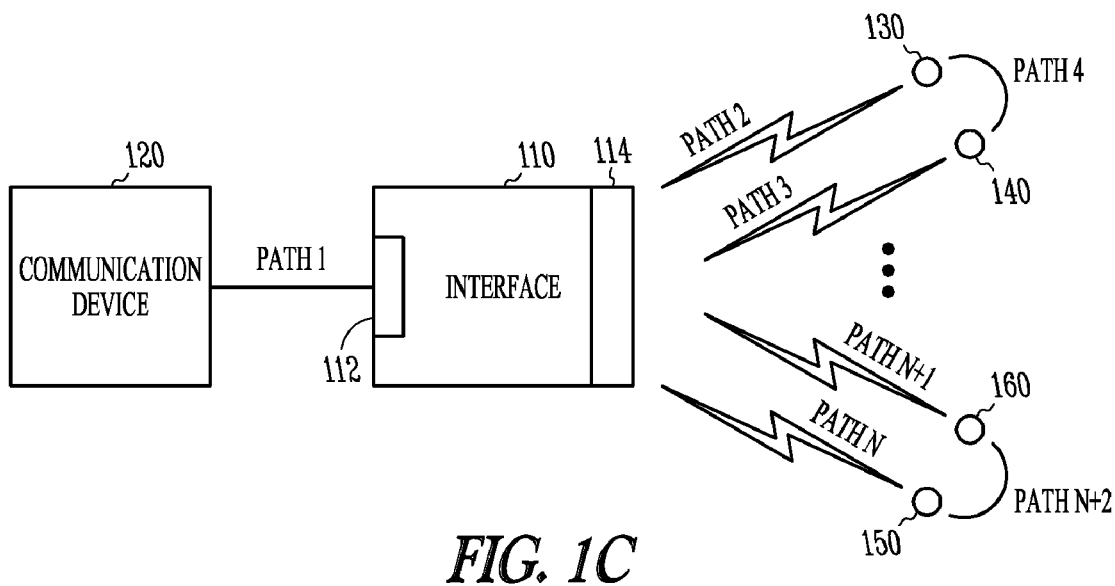

FIG. 1C shows several possible communication paths, each of which may be bidirectional or unidirectional, depending on the programming of the interface 110. In various embodiments, the interface 110 and second port 114 can support different communication modes including communications to a specific device (hereinafter a "unicast"), communications to a specific number of devices (hereinafter a "multicast") and/or communications to all such devices (hereinafter a "broadcast").

Special unicast, multicast, and broadcast modes can be established once it is known whether a user has a pair of wireless audio devices. For example, in the case where at least one user has two wireless audio devices, a user unicast is the act of sending information to one user, whether by a single wireless audio device of that user or to both wireless audio devices of that user. A user multicast and user broadcast can also be performed based on the knowledge of which devices any user has.

Various embodiments feature programmable communication modes to adapt to different communication applications and environments. In various embodiments interface 110 is programmable to provide different configurations employing unidirectional and bidirectional communication modes over every communication path supported by the interface 110. Consequently such communication modes are adjustable and highly programmable.

Wireless

In various embodiments, the first port 112 of the system 100 is adapted to be wireless. In such embodiments, one or more wireless communications can be supported from communication device 120 to interface 110. In various embodiments the wireless communications can include standard or nonstandard communications. Some examples of standard wireless communications include link protocols including, but not limited to, Bluetooth™, IEEE 802.11 (wireless LANs), 802.15 (WPANs), 802.16 (WiMAX), 802.20 mobile wireless, cellular protocols including, but not limited to CDMA and GSM, ZigBee, and ultra-wideband (UWB) technologies. Such protocols support radio frequency communications and some support infrared communications. It is possible that other forms of wireless communications can be used such as ultrasonic, optical, and others. It is understood that the standards which can be used include past and present standards. It is also contemplated that future versions of these standards and new future standards may be employed without departing from the scope of the present subject matter.

In various embodiments, the second port 114 of the system 100 is adapted to be wireless. One or more wireless communications can be supported. In one embodiment, CSMA communications are supported. In various embodiments the wireless communications can include standard or nonstandard communications. Some examples of standard wireless communications include link protocols including, but not limited to, Bluetooth™, IEEE 802.11 (wireless LANs), 802.15 (WPANs), 802.16 (WiMAX), 802.20 mobile wireless, cellular protocols including, but not limited to CDMA and GSM, ZigBee, and ultra-wideband (UWB) technologies. Such protocols support radio frequency communications and some support infrared communications. It is possible that other forms of wireless communications can be used such as ultrasonic, optical, and others. It is understood that the standards which can be used include past and present standards. It is also contemplated that future versions of these standards and new future standards may be employed without departing from the scope of the present subject matter.

The use of standard communications makes interface 110 readily adapted for use with existing devices and networks, however, it is understood that in some embodiments nonstandard communications can also be used without departing from the scope of the present subject matter.

Wired

In various embodiments, the first port 112 of the system 100 is adapted to be connected to communication device 120. Such connections include, but are not limited to, one or more mono or stereo connections or digital connections having link protocols including, but not limited to IEEE 802.3 (Ethernet), 802.4, 802.5, USB, ATM, Fibre-channel, Firewire or 1394, InfiniBand, or a native streaming interface. Such connections include all past and present link protocols. It is also contemplated that future versions of these protocols and new future standards may be employed without departing from the scope of the present subject matter.

The use of standard communications makes interface 110 readily adapted for use with existing devices and networks, however, it is understood that in some embodiments nonstandard communications can also be used without departing from the scope of the present subject matter.

Hybrid

In various embodiments, the first port 112 of system 100 is adapted to have one or more wireless and one or more wired interfaces. Programmable and selectable options are provided by various embodiments.

Processing and Formatting

In various embodiments, the first port 112 is adapted to receive information from communication device 120, process or format it if required, and transmit the information to one or more wireless audio devices 130. The first port 112 receives information from communication device 120 and transmits it to one or more wireless audio devices 130 and 140. The wireless audio devices 130 and 140 use the information to provide audio to a listener. In one application, streaming audio packets are received from communication device 120 and transmitted to the wireless audio devices 130 and 140. In some embodiments, the streaming audio is in stereo and the listening devices are right and left listening pairs which are individual wireless receivers. The interface 110 can transmit stereo information which is received by the proper wireless audio device to preserve the stereo nature of the information. In some embodiments, the wireless audio devices 130 and 140 have a communication path between them to transmit various information or control signals wirelessly to each other. In various embodiments the protocol adopted by interface 110 will support communications between wireless audio device 130 and 140.

Formatting of information transceived with the wireless audio devices is adapted to place the information in a protocol that is power conservative and compatible with such devices. For instance, in the case where the wireless audio devices include hearing aids, such devices naturally are limited to form factors that are suitable for behind-the-ear and in-the-ear geometries. Such size restrictions are substantial, since they limit the battery size and thus the power available to any such device and they limit the size of antennae and communications electronics to spaces not used by microphones, signal processing, and receiver electronics.

In some embodiments the ability to transfer information readily between the interface 110 and the wireless audio devices permits shared processing and storage. Thus, this new topology can reduce certain processing and storage requirements of the wireless audio devices and can enhance the signal processing power of such devices using the system as a whole.

Communication Device Options

It is understood that in various embodiments the communication device 120 can be a variety of different data sources and via a variety of connections. For instance, in one application, it includes a computer connected to a content source over a network, such as the Internet. In one application, it includes a storage device, such as an iPod™ or other streaming audio device. In one application it includes a connection to a wireless audio source. In one application it includes a connection to a Bluetooth telephone. In one application it includes a wireless connection to a computer having a Bluetooth transceiver. In one application it includes a wireless connection to a Bluetooth MP3 player. In one application it includes a wireless connection to an audio/video device equipped with a Bluetooth interface. In one application it includes a wireless connection to a stereo device having a Bluetooth interface. In various applications a number of wireless protocols are supported, including, but not limited to wi-fi, wi-max, ZigBee, and UWB. One application includes a wired stereo or mono connection. It is understood that a number of device and communication combinations may be supported. Many applications are possible without departing from the scope of the present subject matter, and those provided herein are intended to be demonstrative and not exclusive or exhaustive.

It is understood that the data communicated between the interface 110 and the communication device 120 can include, but are not limited to, any of the following, which are provided to demonstrate some options, and are not intended to be exclusive or exhaustive: streaming audio data; software or program data; variable or parameter data; biometric data; control signals; security or encryption data; diagnostic data; and/or status data.

Interface Options

Figure 2:
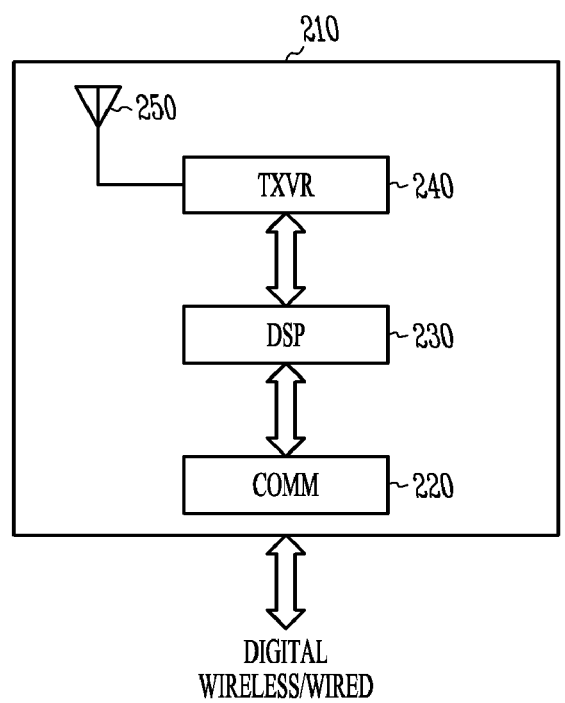
FIGS. 2-5 provide some examples of an interface according to some embodiments of the present subject matter.

The interface 110 can have a variety of first ports 112, some of which will be demonstrated by FIGS. 2-9. FIG. 2 shows an embodiment of interface 210 which receives a digital signal using communication port 220 from a source, such as a communication device 120. The signal is processed by a digital signal processor 230 and transmitted to one or more wireless audio devices via transceiver 240 using antenna 250. In one embodiment, the digital signal is wireless. In one embodiment, the digital signal is wired. The digital signal may be transceived bidirectionally, transmitted unidirectionally or received unidirectionally by communication port 220 of interface 210.

In receive mode, wireless signals from one or more wireless audio devices are received at antenna 250 and demodulated by transceiver 240. The signals are processed by digital signal processor 230 and any resulting transmissions are sent to communication port 220 for transmission to a communication device 120.

The drawing shows an antenna 250 which is shared for transmit and receive in one embodiment. Various embodiments may incorporate separate receive and transmit sections and antennas without departing from the scope of the present subject matter. Furthermore, the antennas can be located on a substrate of the interface 210 in various embodiments. In other embodiments, the antenna may be external to the interface 210. Various types of antennas, including omnidirectional and directional antennas may be used.

Figure 3:
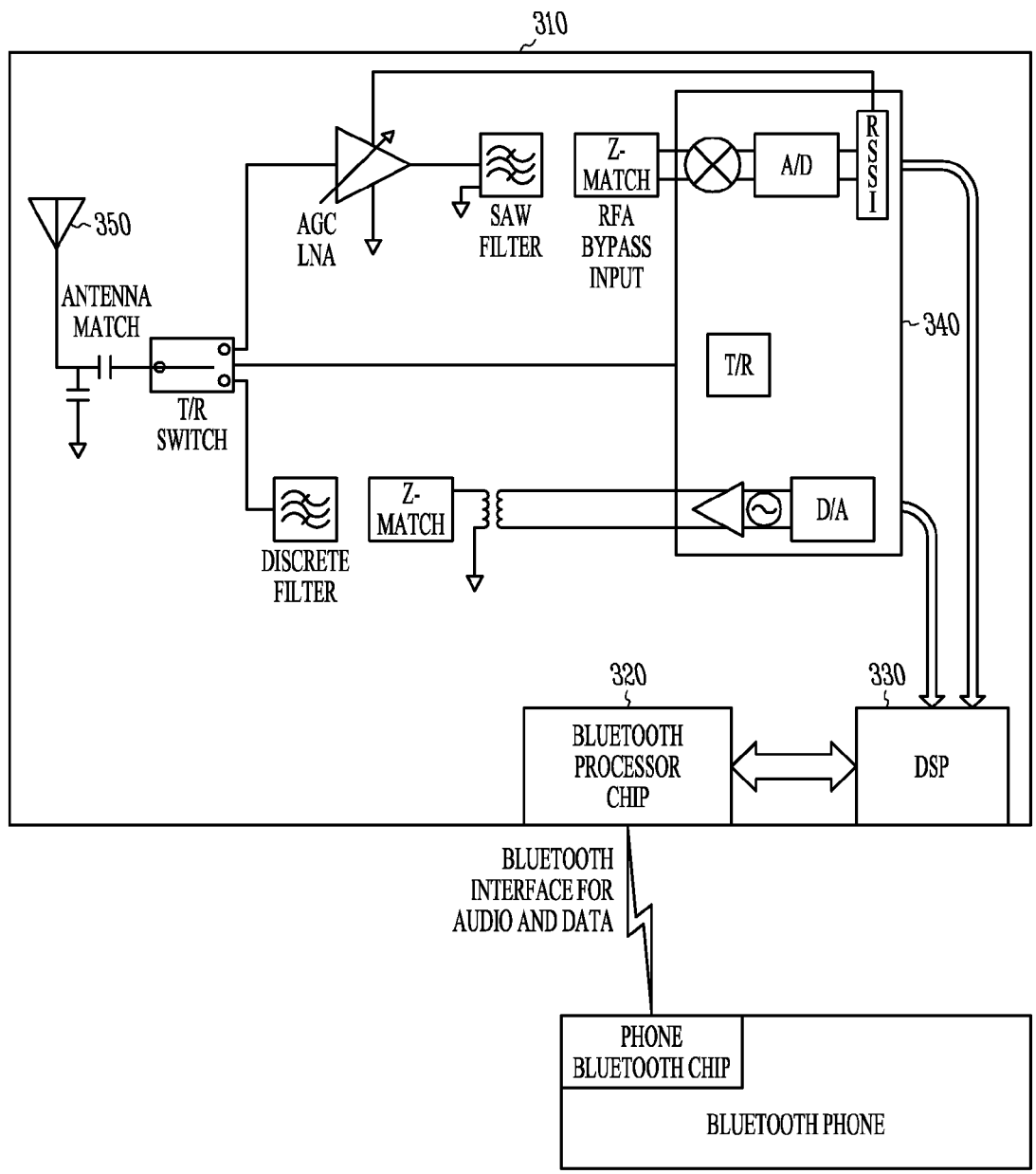

FIG. 3 demonstrates one example of a block diagram showing more details of one example of an interface shown generally in FIG. 2. The communication port 220 is replaced with a Bluetooth processor 320, for example. DSP 330 provides processed digital signals to transceiver 340. The remaining portions of FIG. 3 pertain to impedance matching and gain control of the reception and transmission of signals. Other topologies and circuit designs are possible without departing from the scope of the present subject matter.

In this example, a Bluetooth device, in this example a wireless telephone) is in communication with interface 310 for both audio and data transfer. This demonstrates only one possible wireless first port design and possible communication device. The present description provided further alternative embodiments and future alternative embodiments.

Figure 4:
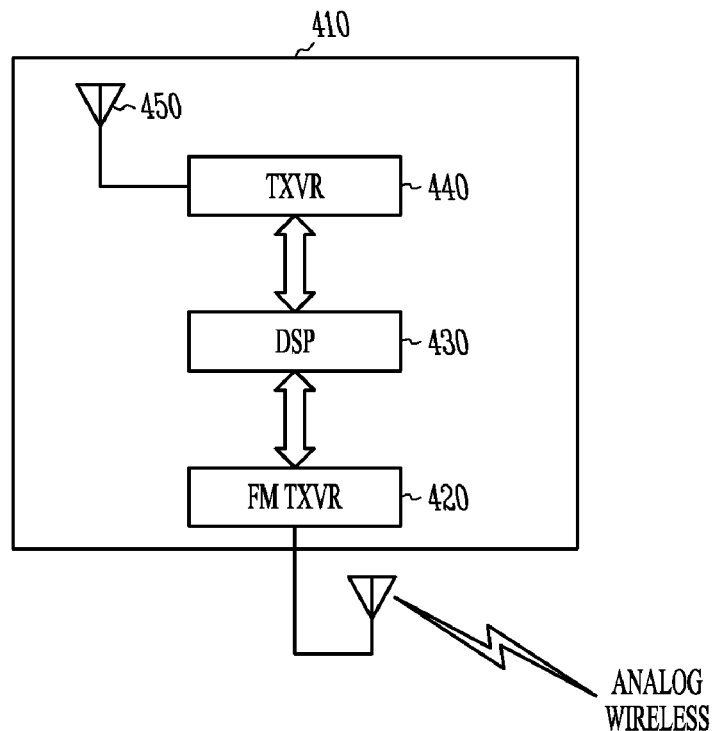

FIG. 4 demonstrates an example of an analog wireless signal input, such as FM into wireless interface 410. In this example, an FM transceiver 420 is used to receive and demodulate the FM signal. DSP 430 will process the received and demodulated information and transceiver 440 will transmit processed information to one or more wireless audio devices via antenna 450. In various embodiments, the system can also broadcast FM using information including signals from one or more wireless audio devices. Other topologies and circuit designs are possible without departing from the scope of the present subject matter.

Figure 5:
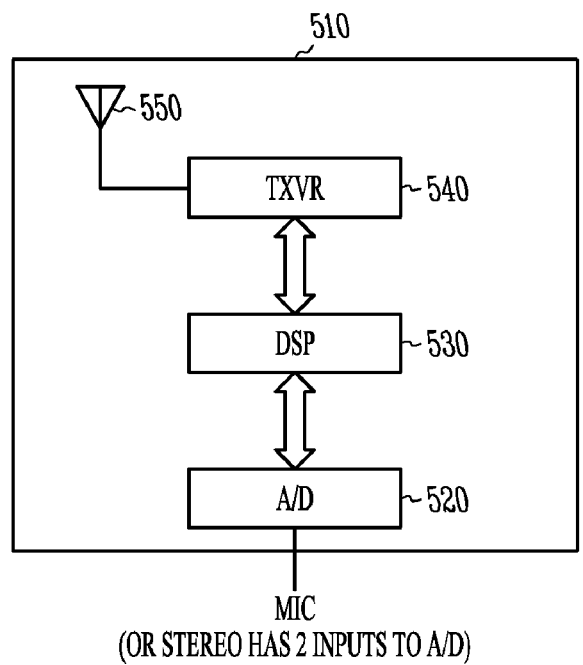

FIG. 5 demonstrates a wired analog input system where signals from a microphone or microphones are input into interface 510. The analog-to-digital convertor 520 produces digital versions of the signal which are processed by DSP 530. Transceiver 540 is adapted to conduct communications with one or more wireless audio devices via antenna 550. Transceiver 540 is capable of unidirectional or bidirectional communications as needed. Other topologies and circuit designs are possible without departing from the scope of the present subject matter.

Figure 6:
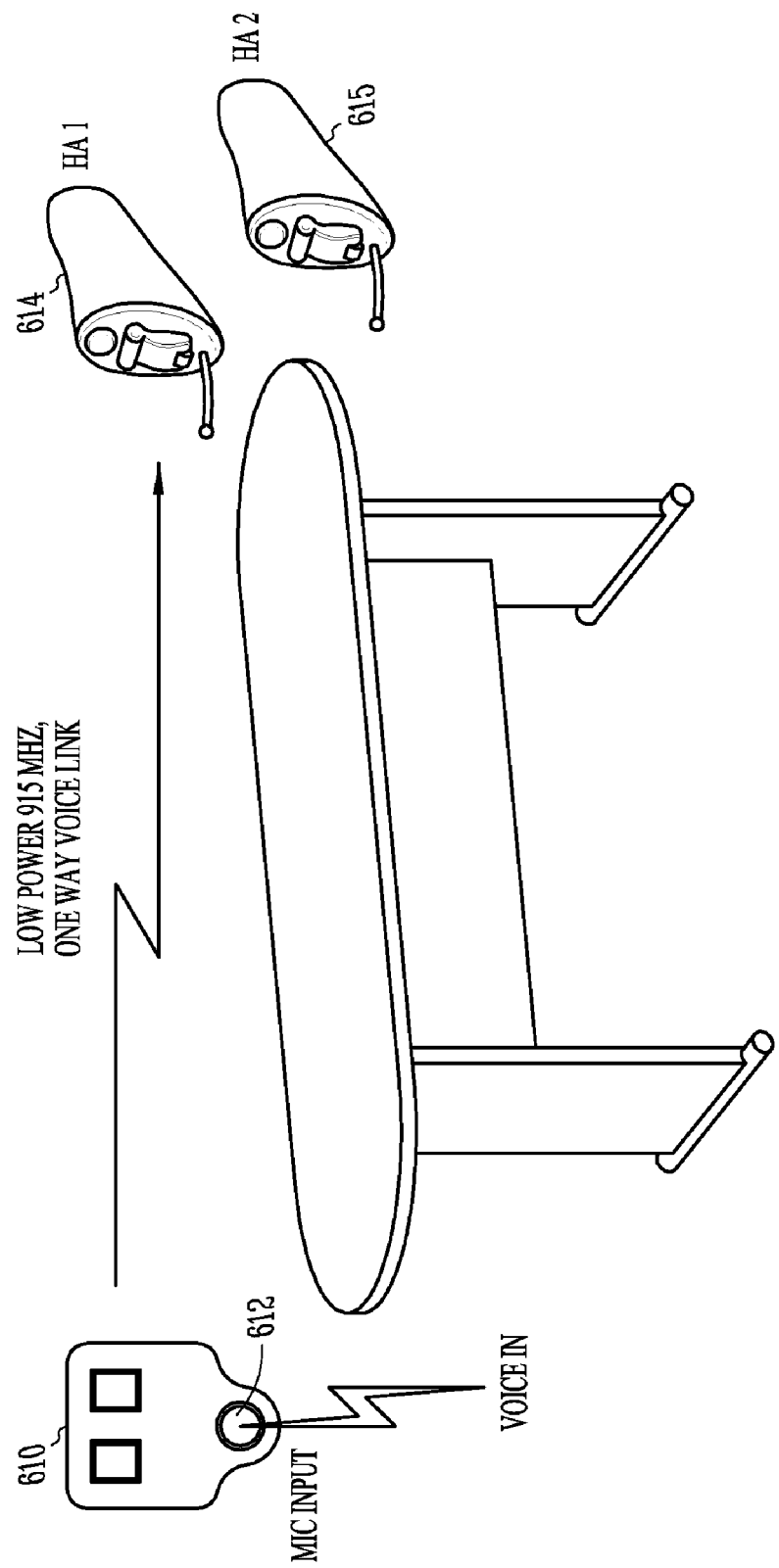
FIG. 6 shows a microphone application according to one embodiment of the present subject matter.

FIG. 6 demonstrates a system, such as one shown in FIG. 5 where the microphone 612 is built into a small portable device 610 having wireless communications ability with wireless audio devices 614 and 615. In one embodiment, the link is a low power one way voice link. In various embodiments, the frequency of transmission will be different. In one embodiment for use in the U.S. the transmissions are at about 915 MHz, however, other frequencies discussed herein may be used without departing from the present subject matter. Device 612 affords a hearing impaired person a better chance of hearing a speaker, since it may be attached to a speaker to give clearer and crisper sound to the hearing impaired. The output of the device may be unicast, multicast, or broadcast to provide one or more hearing impaired persons the ability to hear a speaker better.

The device 610 acts as a wireless microphone that communicates with the wireless audio devices (e.g., hearing aids) 614 and 615 and with any other device having a compatible radio. In various embodiments the device 610 is small, portable, and self powered. In various embodiments, it can be easily passed around or easily attached to garments. It can be unobtrusive. Device 610 comprises a microphone, which may be omnidirectional or directional. The microphone may be programmable for better audio reception in different conditions. Device 610 also includes a wireless radio for at least one directional communications, but which may have support for bidirectional communications in various embodiments. Device 610 includes a power supply, such as a battery, an on-off switch or soft switch and software to perform communications and controls.

Figure 7:
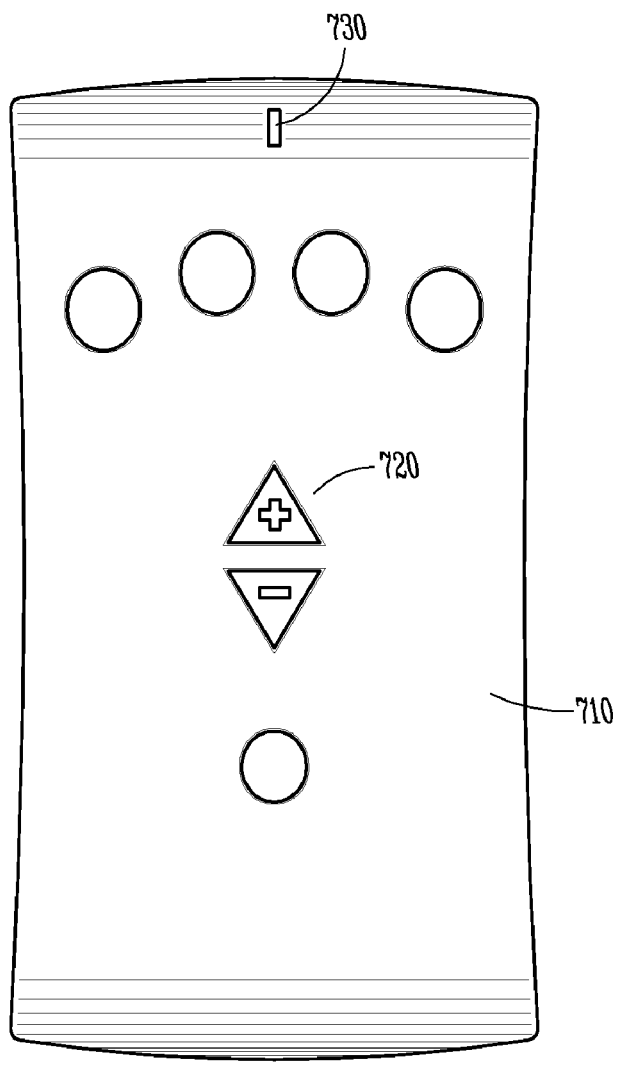
FIG. 7 shows a wireless audio controller according to one embodiment of the present subject matter.
Figure 8:
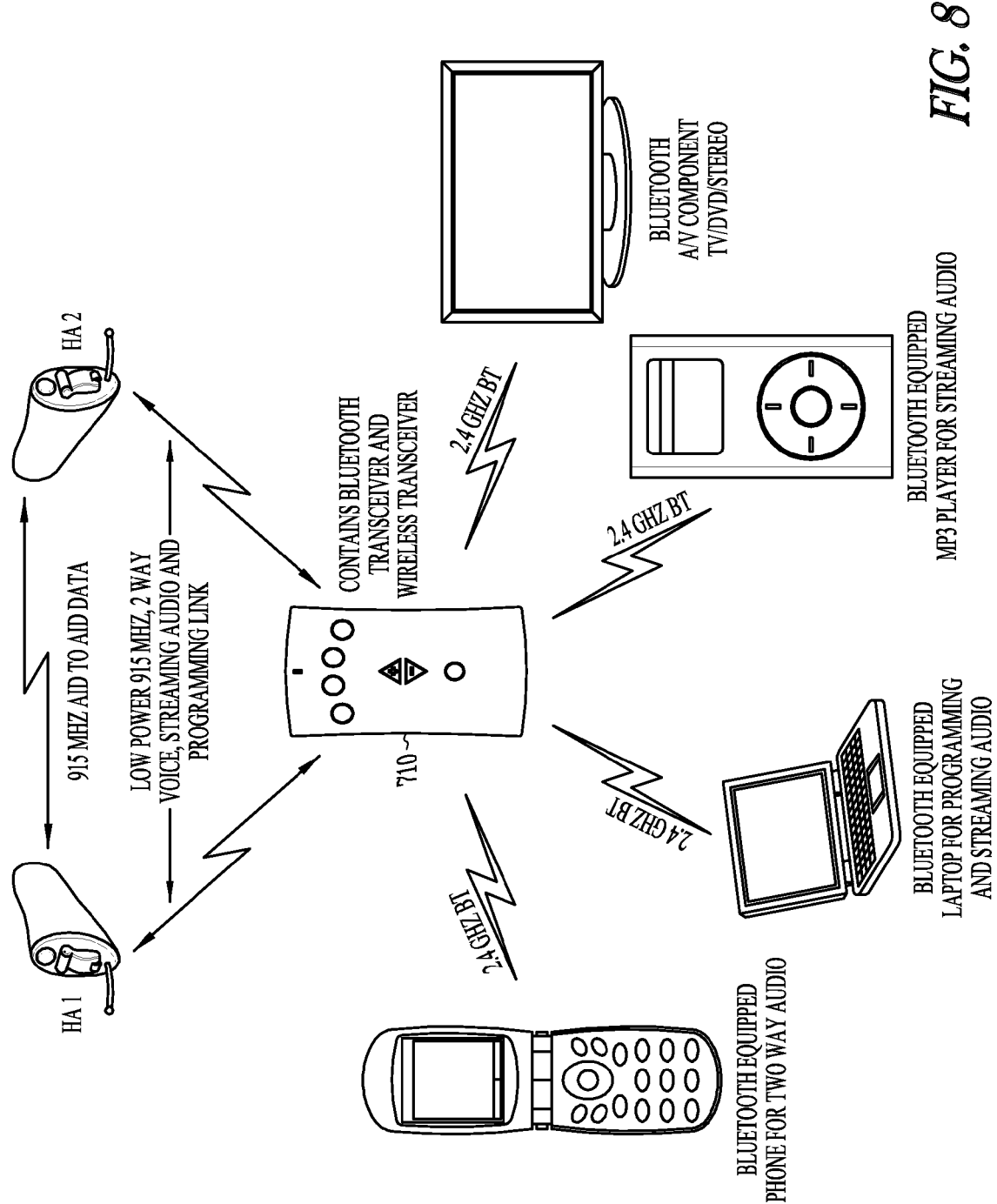
FIGS. 8 and 9 show some examples of applications of the interface to demonstrate that several communication modes and uses of the present system are possible according to some embodiments of the present subject matter.
Figure 9:
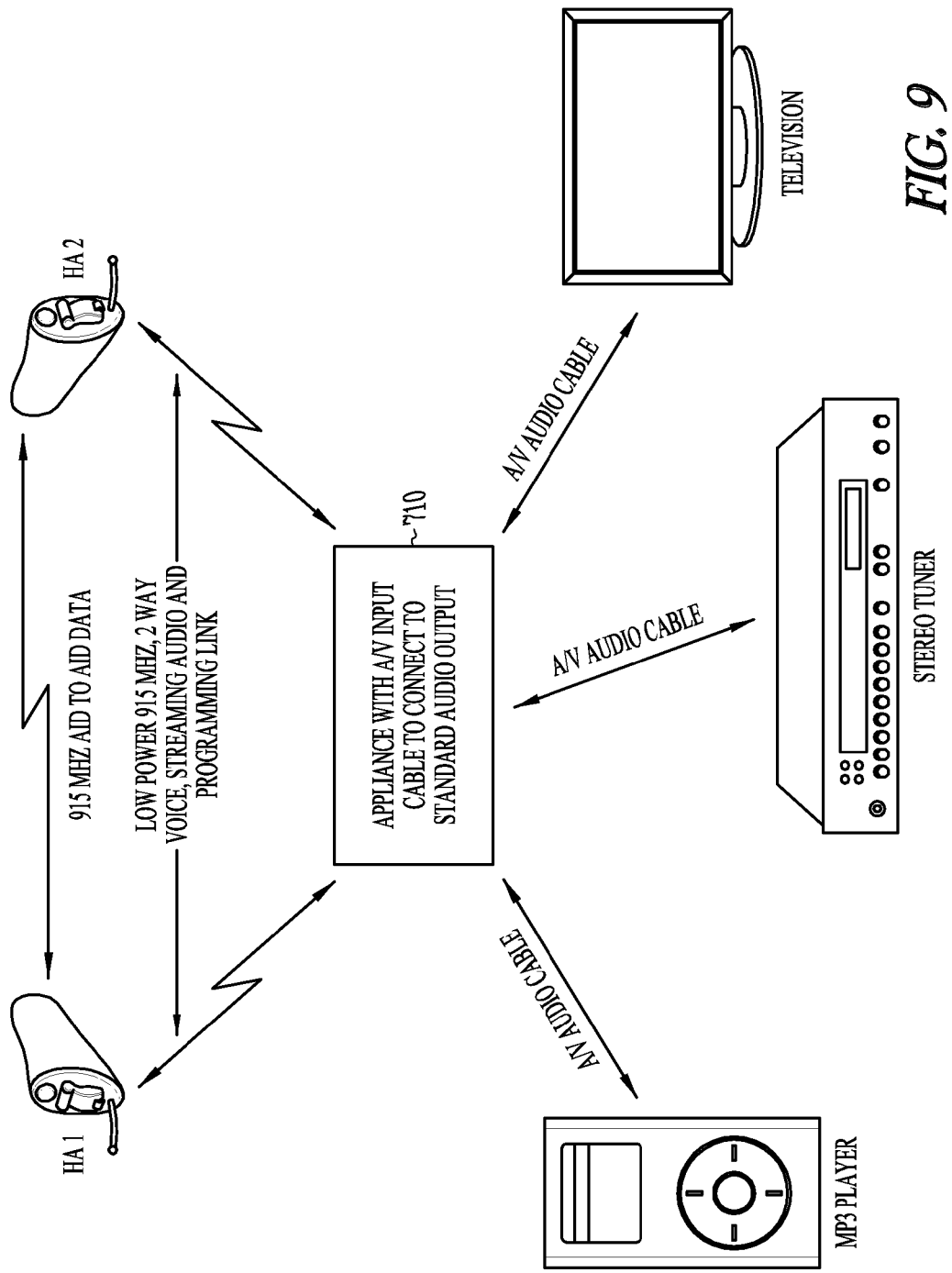

FIG. 7 shows one example of an interface 110 which is called a wireless audio controller (WAC) 710 which is capable of interfacing with a variety of communication devices, including, but not limited to a microphone, a cellular or Bluetooth device, and a network device. As shown in FIG. 7, one embodiment features volume controls 720 and a microphone 730 as optional features. The WAC can be used to assist a person with wireless audio devices to communicate with a variety of wireless and wired devices, as shown in FIGS. 8 and 9. Even though FIGS. 8 and 9 show hearing aids HA1 and HA2 with wireless interfaces, it is understood that the WAC can communicate with other wireless audio devices having a compatible radio interface and with other wireless devices that have a compatible radio interface (e.g., a router or memory with a compatible wireless interface).

FIG. 8 and FIG. 9 are intended to demonstrate a variety of different wireless and wired communication devices and communication protocols supported by wireless audio controller 710 in various hearing aid applications. The figures show communications at 915 MHz, however, such frequencies are only according to one embodiment and other frequencies as set forth herein may be used without departing from the scope of the present subject matter. It is also understood that any of the wireless protocols may be used without departing from the scope of the present teachings.

Hearing Aid Applications and Protocol

In certain applications, the wireless audio devices 130 and 140 are one or more hearing aids, including, but not limited to behind-the-ear hearing aids, in-the-ear hearing aids, and completely-in-the-canal hearing aids.

In one embodiment employing hearing aids a specialized wireless protocol has been designed to facilitate wireless communication of information received by the interface 110 (which may have been received using either a wired or wireless first port 112 embodiment) in packetized format to the hearing aids. This wireless protocol was designed to provide a high speed communications link for low power systems at frequencies selected to be compatible with other types of communications.

In various embodiments path 1, path 2, and path 3 are bidirectional communication paths. Other embodiments exist without departing from the scope of the present subject matter. For instance, the directionality of the communication paths may vary depending on applications and the need for a direction of communications.

In various embodiments, the wireless protocol is provided with additional support for communications between one wireless audio device and another (for example, path 4).

In various embodiments, the wireless protocol also supports communications to one or more additional wireless audio devices, for example, such as the hearing aid user communicating with interface 110 via path N and path N+1 in FIG. 1C. In one embodiment, this is accomplished using a CSMA transmission approach. Such a system can be programmable to support unicasts, multicasts, broadcasts, and communications with either specific wireless audio devices and/or specific users of a pair of such devices.

Hearing Assistance Device Special Functions

Given the flexibility of the system set forth, it is understood that the applications involving hearing aids can support a variety of intelligent digital signal processing functions, including, but not limited to diotic presentation. Some examples of diotic presentation include, but are not limited to, U.S. Patent Application No. 2003/0215106 to Bren et al., U.S. Patent Application No. 2004/0052391 to Bren et al., which are hereby incorporated by reference in their entirety.

Also available are advanced operations for processing sound for telecoil operations, including but not limited to those provided in U.S. Pat. No. 6,760,457 to Bren et al., U.S. Pat. No. 6,633,645 to Bren et al., U.S. Patent Application No. 2004/0052391 to Bren et al., and U.S. Patent Application No. 2003/0059073 to Bren et al., all of which are incorporated by reference in their entirety.

Such systems can support voice communications, speech recognition, and other intelligent sound processing. One example of speech detection includes but is not limited to that provided by European Patent Application 1519625 to Victorian et al., which is hereby incorporated by reference in its entirety.

One Example of a Wireless Protocol for a Hearing Aid Application

The present subject matter includes various wireless communication protocols. In various embodiments, wireless protocols provide a specification for the interchange of information between wireless audio devices (e.g., hearing aids and hearing aid accessories). In various embodiments, communications take place over a radio frequency communications channel. The following example of a wireless communication protocol provides a specification for the interchange of information between a hearing instrument (such as a hearing aid) and one or more hearing instrument accessories over a radio frequency communications channel, with the protocol adapted to provide for shared transmission channel access.

What will be described is one approach to such a wireless communication protocol. Changes to order of bits, number of bits, purpose, contents, order of procedures, error checking procedures, and processes set forth can be made without departing from the scope of the present subject matter. It is believed that one of skill in the art upon reading and understanding this document will understand variations that do not depart from the teachings provided herein. The following wireless communication protocol is therefore intended to be demonstrative of only one embodiment and not exhaustive or exclusive of the approaches provided by the present teachings.

The example wireless communication protocol communicates information in the form of packets or frame format. A frame is delimited at the beginning using a start flag. The frame start flag is preceded by the preamble for the purpose of establishing symbol timing. A general frame format is shown in Table 1.

TABLE 1

| Preamble | Start Flag | Packet Content |
| --- | --- | --- |

The example wireless communication protocol includes protocol layering. In various embodiments, protocol layering exists to help modularize the protocol implementation. In various embodiments, protocol layers break the communications protocol into smaller, less complex constituents while hiding the details of the actual implementation (also known as abstraction). One goal accomplished through the use of layered protocol is to reduce the dependence of one layer on another. An additional benefit is a reduction in the side effect of abstraction. Consequently, protocol layering allows protocol implementations to change while minimizing the need to modify other protocol layers.

Table 2 illustrates notation used in describing protocol data formats of the present example wireless communication protocol.

TABLE 2

| | |
| --- | --- |
| <Value> | An entity or value comprised of transmitted or received data bits. |
| [index] | A discrete time index which specifies the value of an entity at a discrete moment in time. |
| (comment) | Comments, added for clarity. |
| = | Assignment, specifies equivalence of one entity to another entity or a group of entities. |
| xxxxxxxxb | Values ending in a lower case "b" are in binary notation |
| 0xnnnnnnnn | Value prefixed by a "0x" are in hexadecimal notation |

The present wireless communication example is explained, in part, with figures (FIGS.). These figures depict the format of the fields in the sequence that they are transmitted, with the left-most bit transmitted first.

Figure 10:
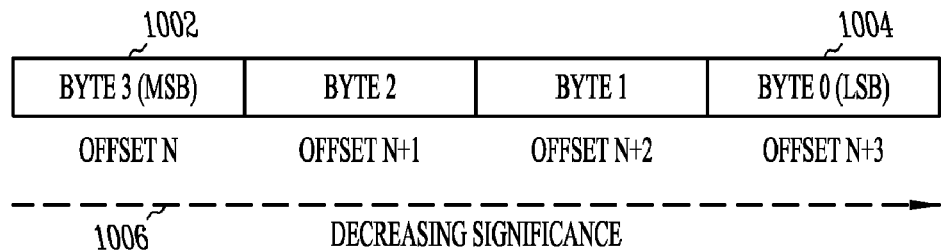
FIG. 10 shows a byte diagram according to one embodiment of the present subject matter.

FIG. 10 illustrates that multi-byte values such as 16 and 32 bit values are ordered in decreasing significance from the Most Significant Byte (MSB) 1002 of the value to the Least Significant Byte (LSB) 1004 of the value. Individual users of the protocol can parse multi-byte data. The MSB is placed into the data stream first, and the LSB is placed into the data stream last 1006.

The present wireless communication protocol example includes bit data ordered in decreasing significance. A byte is ordered as demonstrated in Table 3, with Bit 7, the Most Significant Bit (MSB), transmitted first and Bit 0, the Least Significant Bit (LSB) transmitted last.

TABLE 3

| Bit 7 (MSB) | Bit 6 | Bit 5 | Bit 4 | Bit 3 | Bit 2 | Bit 1 | Bit 0 (LSB) |
| --- | --- | --- | --- | --- | --- | --- | --- |

Processes that require comparison of fields or bits perform that comparison upon those fields or bits with the left-most bit considered most significant, in various embodiments.

Network Structure

The present example of a wireless communication protocol includes a network structure having nodes. This network consists of an arbitrary number of nodes. Each node on the network is uniquely identified with an address that allows for private communication between two nodes. The nature of how a vendor using the protocol formulates its unique address is left to the vendor. The address may be a derivation of the serial number, created during power-on initialization of the component, or it may be configured into the component during the manufacturing process. In the example provided, the transmission over the wireless link is half duplex in that only one node per channel may transmit at any given time. Multiple nodes transmitting simultaneously within range of one another may cause data errors.

The present example of a wireless communication protocol includes node addressing. An address is used to uniquely identify a specific node within a global context. Each node on the network should have a unique identifier to allow communication without any possibility of confusion regarding the intended destination of the communication packet. An address consists of two parts. A vendor id defines the vendor, group of vendors, or all vendors to which a packet is intended. A device id uniquely identifies a device within the context of a vendor id. One example of node addressing is as follows: <Address (25 bits)>=<Vendor ID (3 bits)>+<Device ID (22 bits)>. Thus, the present system allows for independent addressing of each device having a protocol-compatible receiver. This provides control as to whether a transmission will be a singlecast, multicast, or broadcast transmission.

The present example of a wireless communication protocol includes a vendor ID. The vendor id is a 3-bit value indicating a specific vendor, combination of vendors or all vendors. Defined values are shown in Table 4.

TABLE 4

| Value | Vendor |
| --- | --- |
| 000b | Reserved |
| 001b | Organization 1 |
| 010b-110b | Reserved |
| 111b | Broadcast/Multicast to all hearing instruments across all vendor address spaces. |

Reserved vendor IDs may be defined to represent multiple vendors thus allowing the ability to broadcast to a specific group of vendors.

The present example of a wireless communication protocol includes a device ID. A Device ID is a vendor defined 22-bit value. The method of deriving a Device ID associated with a specific vendor ID is the responsibility of each vendor. Each vendor is responsible for allocating and maintaining the proper address range(s) for any and all wireless devices (i.e. hearing aids, remotes, programmers) supported by that vendor. In addition, each vendor is responsible for allocating and maintaining the proper address range(s) for intra-vendor broadcast/multicast.

TABLE 5

| Bits 21-0 |
| --- |
| Vendor Supplied |

The Device ID address space associated with the broadcast/multicast vendor ID has the following restrictions: Device ID 0x3FFFFF is reserved as the inter-vendor broadcast address; the Device ID range of 0x000000 thru 0x3FFFFE are reserved as dynamic inter-vendor multicast addresses.

The present example of a wireless communication protocol includes various addressing types. Three types of addressing are allowed: unicast, multicast, and broadcast. Unicast addressing allows only two nodes to communicate. Multicast addressing allows one node to transmit to a selective group of nodes, such as a Programming device communicating simultaneous information to a left and right hearing aid. In some embodiments, multicast addressing does not include packet acknowledgement. Broadcast addressing allows one node to transmit to all nodes, such as a Programming device discovering all nodes within range. In some embodiments, broadcast addressing does not include packet acknowledgement.

Unicast addressing involves one sender and one receiver. Examples include a programmer communicating with a single hearing aid or two hearing aids communicating with each other.

Multicast addressing involves a single sender and multiple receivers. Multicast addresses are application specific in that the address value and its usage are the responsibility of the application controlling the data flow. An example might be a programmer communicating information simultaneously to two hearing aids.

Broadcast addressing involves a single sender and multiple receivers using a predefined broadcast address. The set of receivers can include receivers specific to one vendor, several vendors, or receivers across all vendors. An example might be an audio transmission intended for all hearing aids within the range of the transmitter in an auditorium situation.

Protocol Stack

Figure 11:
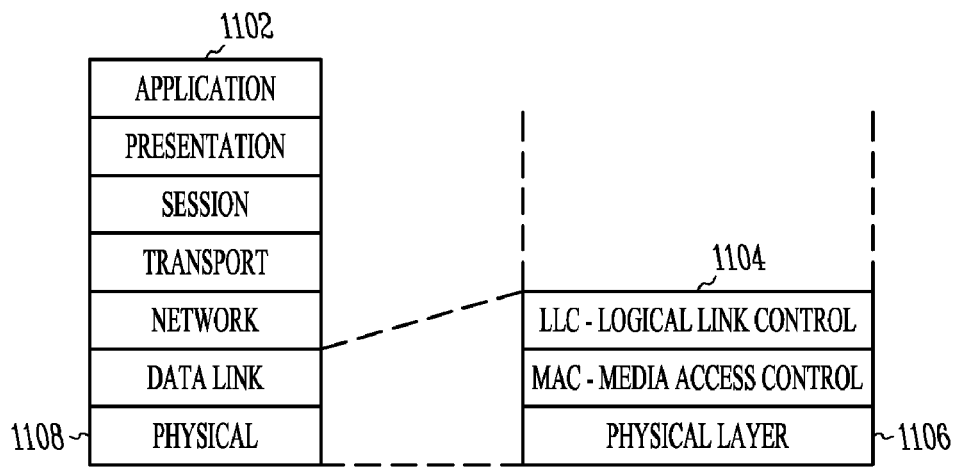
FIG. 11 shows various layers of the system according to one embodiment of the present subject matter.

FIG. 11 shows that the present example protocol includes a set of layered protocols 1102 in which each layer performs a set of logically related communications tasks while hiding, or abstracting, the details of the protocol layer implementation. The basic principle of layering is to create independence between layers. This is accomplished by defining services provided by each layer to the next higher layer without defining how the services are to be implemented. This permits changes in a layer without affecting other layers and allows for modular implementation of the complete communications system.

Each protocol layer provides services and a means to send and/or receive data. Data to be sent through a protocol is referred to as a Service Data Unit (SDU), or payload. The Link Protocol encapsulates the SDU with protocol control information to form a Protocol Data Unit (PDU), also referred to as a frame or data packet. The primary focus of this document is the physical and data link layers 1104, as illustrated in FIG. 11.

The physical layer protocol 1106 operates at Layer 1 and is functionally equivalent to the physical layer 1108 of the OSI model 1102. This protocol layer defines a means to control and monitor transceiver operation. It provides data serialization over an RF channel and is concerned with individual bit transmission. To ensure proper receiver operation, and for receiver PLL clock derivation, the packet data can be encoded to ensure the necessary density of rising and falling edges.

The RF carrier frequency range of the system may vary. The system will work on any number of available frequencies, however legal regulations will limit the bands available for use in any country. Since these bands will vary with time, and since the present teachings will work in any variety of bands, the present description is not limited to the bands set forth herein. At the time of the filing of this application, the frequencies believed to be available include, but are not limited to about 795 MHz to 965 MHz in the United States, for one example. In another example, the range is about 902 MHz to 908 MHz. In another example, a center frequency of approximately 915 MHz is used. The frequency used is dependent on the local regulations of the country of origin for the user of a device. In general, frequencies starting at about 700 MHz and up may be used in many countries. Other frequencies may be used without departing from the scope of the present subject matter.

Many more countries have regulations which are too numerous to be included herein. Some will be listed purely for examples. For instance, in Canada, it is believed that one available range is about 902 MHz to 928 MHz. Another example is Europe in which a range of about 863 MHz to 865 MHz can be used. Another example is that in Japan a range of about 806 MHz to 810 MHz can be used. Another example is that in Australia a range of about 918 MHz to 926 MHz can be used. Another example is that in China a range of about 702 MHz to 798 MHz can be used. Another example is that in Taiwan the range includes frequencies over about 960 MHz. Another example is that in Korea a range of about 928 MHz to 930 MHz or about 950 MHz to 952 MHz can be used. Another example is that in Columbia a range of about 902 MHz to 924 MHz can be used. Another example is that in Brazil a range of about 902 MHz to 907.5 MHz or 915 MHz to 928 MHz can be used. Another example is that in Mexico a range of about 902 MHz to 928 MHz can be used. Another example is that in Hong Kong a range of about 819.1 MHz to 823.1 MHz or about 919.5 MHz to 920 MHz may be used. Another example is that in Singapore a range of about 866.6 MHz to 869 MHz or about 924 MHz to 925 MHz may be used. Another example is that in South Africa a range of about 863 MHz to 865 MHz may be used. Another example is that in Thailand a range of about 903 MHz to 960 MHz may be used. Another example is that in the Philippines a range of about 902 MHz to 928 MHz or about 900 MHz to 915 MHz may be used. Another example is that in Bulgaria a range of about 863 MHz to 865 MHz may be used. Again, it is noted that the ranges provided herein are not required for technical operation of the system, but rather for compliance with local laws. Thus, frequencies may change without departing from the scope of the present subject matter.

Centered on a selected frequency is a bank of 6 physical channels spaced 606 KHz apart. The physical channels in a bank should be considered as logical channels 1-6 with logical channel 1 being associated with the lowest frequency physical channel and channel 6 being associated with the highest frequency physical channel.

The modulation type used is Gaussian Continuous Phase 2FSK, ITU designation 150KF1DCN produced by 2-GFSK Bt=0.5. The VCO is frequency modulated with a frequency deviation of +/−46.545 KHz.

The base RF channel data bit rate is defined to be 186182 bits per second.

Figure 12:
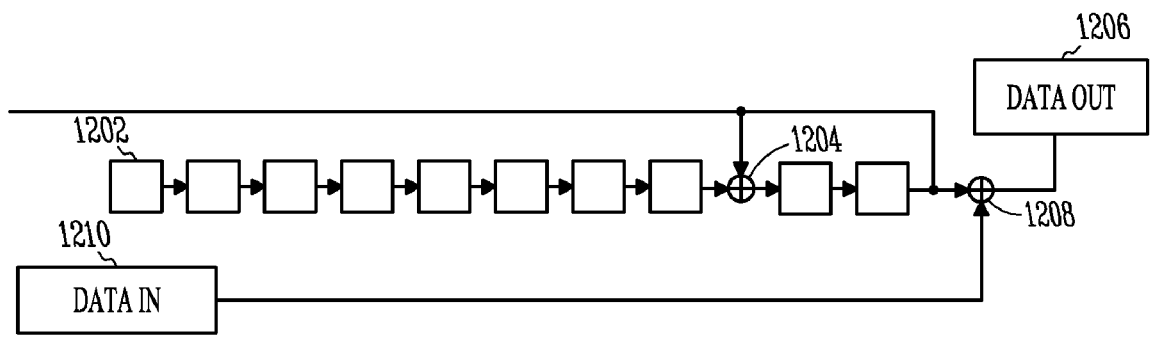
FIG. 12 is logic diagram of the system according to one embodiment of the present subject matter.

This protocol uses a whitening algorithm as the method of encoding data bits on the wireless channel. The whitener is based on the following polynomial: $G(D)=D^{11}+D^2+1$. The algorithm uses a set of values including example value 1202, and combines them according to the polynomial 1204. The result is applied 1208 to incoming data, resulting in data output 1206. The initial seed value for this algorithm is 0x7FE. This algorithm requires that the initial seed value be updated prior to the transmission of each packet. One LFSR structure for the polynomial is illustrated in FIG. 12.

The present example protocol includes a preamble. The preamble is a variable length alternating 10 sequence which is transmitted prior to the Frame Start Flag word. It allows the receiving station to set up its receiver gain, recover the transmit carrier frequency, and adjust its symbol clock for the incoming packet data. The preamble has the following non-encoded format:

<Non Encoded Preamble>=11001100b+11001100b+ 11001100b+1100100b+11001100b+11001100b+ 11001100b+110011100b+11001100b+11001100b The present example protocol includes a Frame Start Flag. This 40-bit flag indicates the start of a new frame and allows the receiving device to establish the unit/byte phase of the inbound data. The start flag word is 0xB14D8F299A.

The present example protocol includes a Data Link Layer. The Data Link Layer operates at Layer 2 and consists of two sub-layers responsible for Media Access Control (MAC) and the Logical Link Control (LLC).

The present example protocol includes a Protocol Data Unit. The data link layer PDU format is shown in Table 6.

TABLE 6

| Frame Start Flag (FSF) | Size (SZ) | Frame Desc. (FD) | Dest. Address (DA) | Src. Address (SA) or Embedded Channel (EC) | Seq. Number (SEQN) | Payload FEC Enable (PFE) | Header Frame Check Sequence (HFCS) | Extended Protocol (EP) (Opt) | Payload (SDU) | Payload Frame Check Sequence (PFCS) (Opt) |
|---|---|---|---|---|---|---|---|---|---|---|

The size and a brief description of each protocol data unit field is shown in Table 7.

TABLE 7

| PDU Field | Size (Bits) | Description |
|---|---|---|
| Frame Start Flag (FSF) | 40 | Indicates the start of frame. |
| Size (SZ) | 10 | The number of bytes following the Header Frame Check Sequence thru the end of the Payload (SDU). |
| Frame Descriptor (FD) | 8 | Describes the frame type, acknowledgement indication, optional extended protocol and optional header. |
| Dest. Address (DA) | 25 | Destination Node Address. |
| Src. Address (SA) or Embedded Channel (EC) | 25 | Source Node Address or Embedded Channel. |
| Seq. Number (SEQN) | 2 | Sequence Number. |
| Payload FEC Enable (PE) | 1 | Indicates if the payload of the message has been Reed Solomon encoded. |
| Reserved | 1 | Reserved for future use. |
| Header Frame Check Sequence (HFCS) | 16 | The header frame check sequence (FCS) is calculated over the size field thru the address field. |
| Extended Protocol (EP) (Optional) | 0 or 8 | Network Service Port Identifier (see Frame Descriptor below). |
| Payload (SDU) | 0-4136 | Service Data Unit (SDU) information. The maximum payload size is dependent upon the frame type. |
| Payload Frame Check Sequence (PFCS) (Optional) | 0, 16 or 32 | The payload frame check sequence (FCS) is calculated over all data following the header frame check sequence thru the end of the payload. The frame type determines if a packet contains a payload FCS and the size, in bits, of the FCS. |

The present example protocol includes a Frame Size. The Frame Size is a 10-bit value indicating the number of bytes following the Header Frame Check Sequence thru the end of the Payload (SDU). The valid range is dependent upon the frame type of a message.

The present example protocol includes a Frame Descriptor. The 8-bit Frame Descriptor determines the format of the frame and is divided into bit fields demonstrated in Table 8.

TABLE 8

| 7 | 6 | 5 | 4 | 3 | 2 | 1 | 0 |
|---|---|---|---|---|---|---|---|
| Version | Embedded Data | Ack Flag | Payload FCS Mode | | Protocol Identifier | | |

The present example protocol includes a Protocol Identifier. The protocol identifier, bits 0-2, indicate the protocol layer to which a particular packet is routed. Defined protocols are demonstrated in Table 9 and in the following text.

TABLE 9

| Bit 2 | Bit 1 | Bit 0 | Protocol Identifier |
|---|---|---|---|
| 0 | 0 | 0 | Ack |
| 0 | 0 | 1 | Media Access (MA) Protocol |
| 0 | 1 | 0 | Hearing Aid Control (HAC) Protocol |
| 0 | 1 | 1 | Bi-Directional Voice (BDV) Protocol |
| 1 | 0 | 0 | One-Way Streaming Audio (OSA) Protocol |
| 1 | 0 | 1 | Reserved |
| 1 | 1 | 0 | Reserved |
| 1 | 1 | 1 | Extended (EX), see Extended Protocols |

000b—Acknowledge indicates that this is a link layer acknowledgement packet sent as a result of bits set in a received frame descriptor.

001b—Media Access Protocol is information destined for logical link control operations like channel reservation.

010b—Hearing Aid Control protocol is information destined for hearing aid control operations like a fitting application.

011b—Bi-Directional Voice protocol is information consisting of two-way audio data, and destined for an audio application 100b—One-Way Streaming Audio protocol is information consisting of audio data, and destined for an audio application.

101b—Reserved.

110b—Reserved.

111b—This code is used to indicate that an additional extended protocol byte is included as part of the frame format for routing purposes.

The present example protocol includes a Payload FCS Mode. In the FCS Mode, bits 3-4 are used to define the number of payload frame check sequence bytes used for error control within the frame. The payload FCS is calculated over the first byte following the header FCS thru the end of the payload (SDU). Defined Payload FCS Modes are demonstrated in Table 10.

TABLE 10

| Bit 4 | Bit 3 | Number of FCS Bytes | Description |
|---|---|---|---|
| 0 | 0 | None | No CRC Used |
| 0 | 1 | 2 | CRC-CCITT |

TABLE 10-continued

| Bit 4 | Bit 3 | Number of FCS Bytes | Description |
|---|---|---|---|
| 1 | 0 | 4 | CRC-32 |
| 1 | 1 | Reserved | Reserved |

Payload FCS Modes 01b and 10b is checked for errors using an error detection method such as those listed herein. Various error detection methods are listed herein.

The present example protocol includes an Ack Flag. The Ack Flag, bit 5, is used to indicate whether this frame should be acknowledged by the Link Layer protocol. If the Ack Flag bit is 0, the frame will not be acknowledged. If the Ack Flag bit is 1, the frame is acknowledged if the FCS check is successful, the frame is not an acknowledgement and the frame does not contain a broadcast or multicast address.

The present example protocol includes Embedded Data. The Embedded Data, bit 6, is used to indicate whether the data in the Embedded Channel field is valid. If the Embedded Data bit is 1, the data in the Embedded Channel field is valid. If the Embedded Data bit is 0, the data in the Embedded Channel field is not valid. In the example protocol provided herein, this field is only valid for bidirectional voice (BDV) or one-way streaming audio (OSA) protocol type packets.

The present example protocol includes a Version. The Version, bit 7, indicates the version of the frame format being received. The value of 0 for this bit represents the first version of the frame format. The value of 1 for this bit is reserved for any future modifications to the frame format.

The present example protocol includes a Destination Address. The destination node address can be any type of unicast, multicast or broadcast address. Additionally, the present example protocol includes a Source Address. The source node address should not be a multicast or broadcast address. Also, the present example protocol includes an Embedded Channel. The embedded channel provides a low speed communications channel between nodes. This field is only valid for bi-directional voice (BDV) or one-way streaming audio (OSA) protocol type packets.

The present example protocol includes a Sequence Number. This field is used for media access (MA), hearing aid control (HAC) or extended (EX) protocol type unicast packets that require a link layer acknowledgement. The link layer acknowledgement (Ack) packet sent in response to the received message should have its sequence number (SEQN) field set equal to the SEQN field in the message received. For any protocol type broadcast or multicast packets the SEQN field should be set to zero.

An individual node should maintain a separate internal transmit and receive sequence number for each node which it has exchanged MA, HAC or EX protocol type unicast packets requiring a link layer acknowledgement. For a transmitting node, transmit and receive sequence numbers is created when the first MA, HAC or EX protocol type unicast packet requiring a link layer acknowledgement is sent. For a receiving node, transmit and receive sequence numbers is created upon valid reception of the first MA, HAC or EX protocol type unicast packet requiring a link layer acknowledgement. The initial value for each field on both the source and destination nodes is zero.

Figure 13:
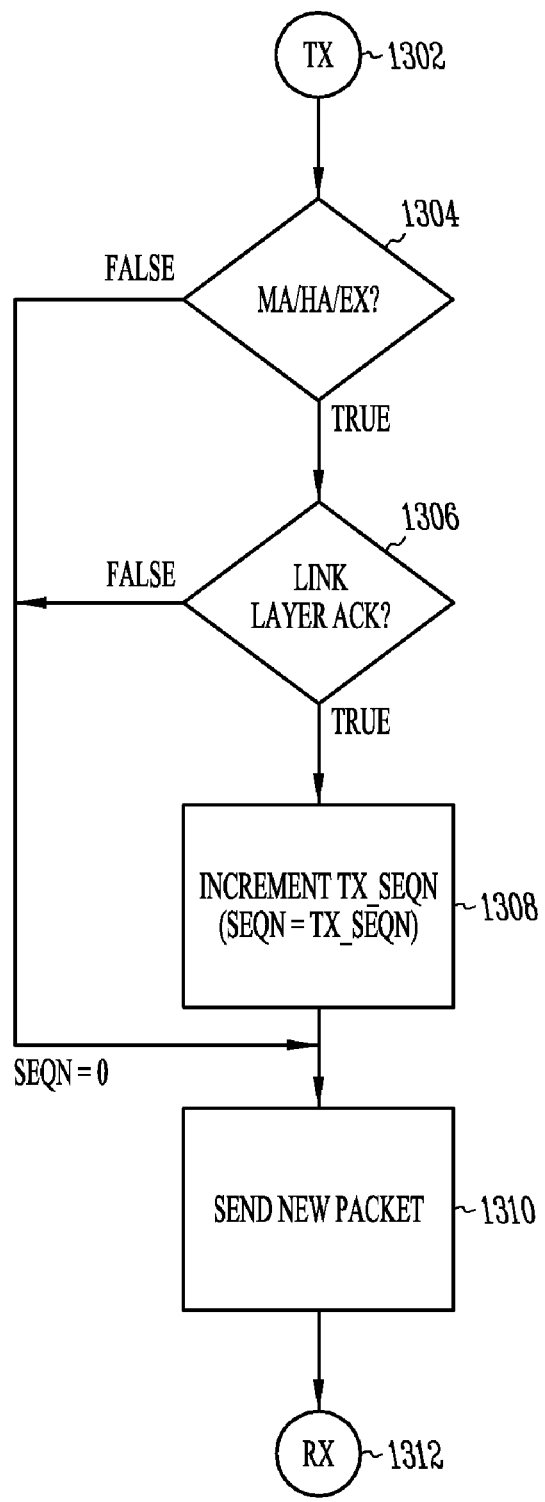
FIGS. 13-16 show various transmission and reception processes of the system according to one embodiment of the present subject matter.

The present example protocol uses a Transmit Sequence Number. Regarding the transmission algorithm of FIG. 13, the transmit 1302 sequence number (TX_SEQN), on the source node, is incremented 1304, 1306, 1308 for every new MA, HAC or EX protocol type, unicast packet sent that requires a link layer acknowledgement. The value is wrapped when it reaches the maximum value. The TX_SEQN, on the source node, is then placed into the sequence number field (SEQN) of the packet transmitted 1310. The packet is then received 1312 In the case of a retransmission of the packet, the TX_SEQN, on the source node, is not changed and thus the packet is retransmitted with the same TX_SEQN as the original packet.

Figure 14:
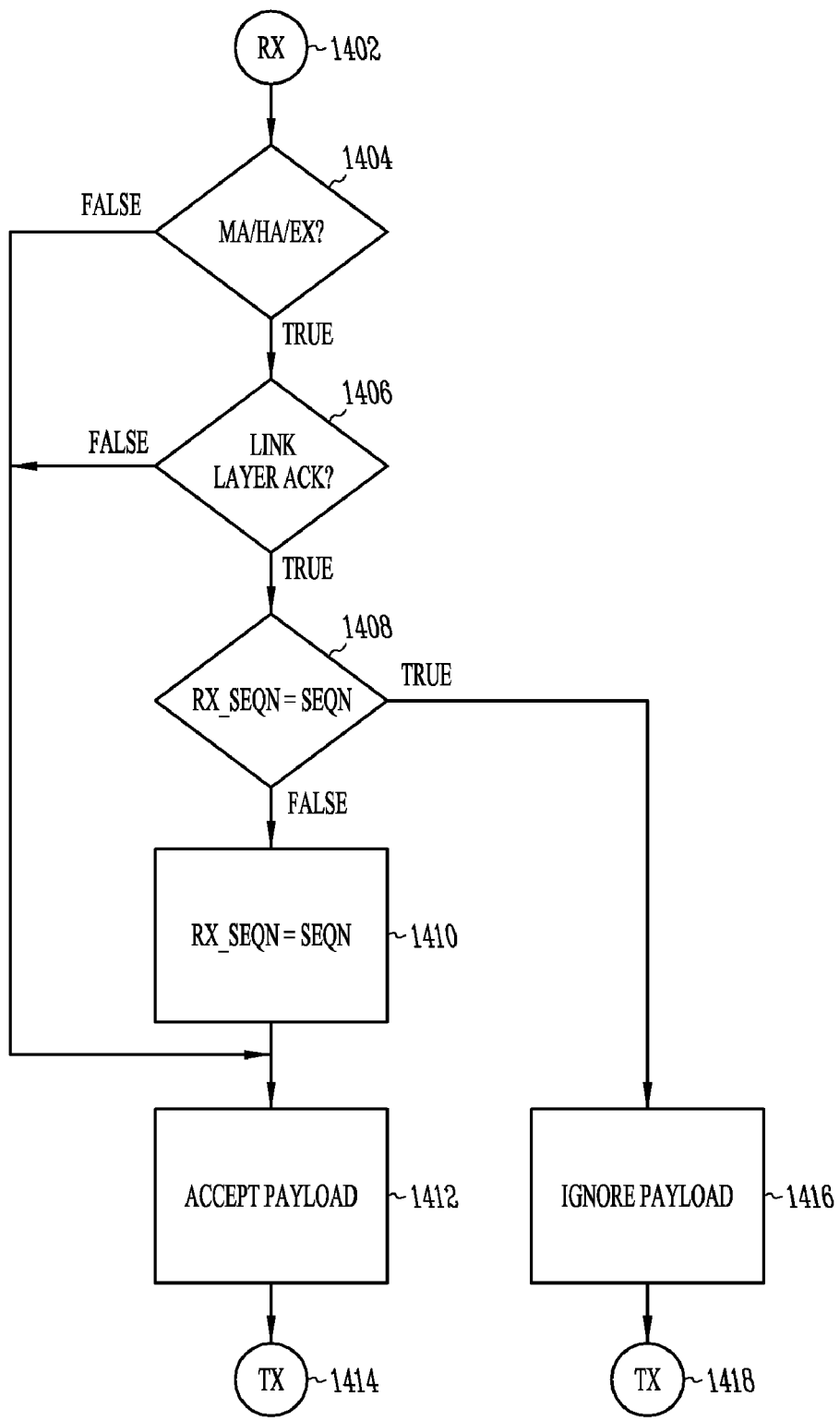

The present example protocol uses a Receive Sequence Number. Regarding the reception algorithm of FIG. 14, the receive sequence number (RX_SEQN), is received 1402 at the destination node. At the destination node, is used to perform the packet filtering 1404, 1406, 1408, 1410, 1412, 1416 upon valid reception of a MA, HAC or EX protocol type unicast packet that requires a link layer acknowledgement. The sequence number value (SEQN) in the received packet should be compared 1408 to the destinations receive sequence number (RX_SEQN). If they are different, a new data payload has arrived and the RX_SEQN is set 1410 to the value of SEQN; otherwise it is the same data payload and can be discarded 1416. Either situation ends with transmission 1414, 1418.

The present example protocol includes a Payload FEC Enable. The Payload FEC Enable bit indicates if the payload of the message has been Reed Solomon encoded. If the Payload FEC Enable bit is 0, no Reed Solomon encoding has been performed on the payload of the message. If the Payload FEC Enable bit is 1, Reed Solomon encoding has been performed on the payload of the message.

The present example protocol includes a Header Frame Check Sequence. The header frame check sequence provides a means of bit error detection for each received frame. The size of this field is two bytes. The FCS contains the Cyclic-Redundancy-Check (CRC) value computed prior to transmission. The 16-bit FCS is based on the CRC-CCITT definition. All data after the Frame Start Flag through the end of the sequence number field is included in the CRC calculation.

In various embodiments, CRC calculations are accomplished before encoding at the source and after decoding at the destination. Additionally, a node can be configured to either ignore or process packets where the header frame check sequence detects bit errors in the header. If a packet is received and bit errors in the header are detected via the header frame check sequence and a node is configured to ignore these packets, the frame will not be promoted to the next level of protocol, nor will a link layer acknowledgement packet be generated if required.

The present example protocol includes Extended Protocols. The Extended Protocol byte is only present if the frame type bits in the Frame Descriptor byte are set to 111b. The extended protocol byte should be a valid network service identifier which is used to route the received packet to the proper layer. Various application and network service identifiers are included herein.

The present example protocol includes a Payload. The payload field contains application specific information. The present example protocol additionally includes a Payload Frame Check Sequence. The payload frame check sequence provides a means of bit error detection for each received frame. The size of this field is up to four bytes. The FCS contains the Cyclic-Redundancy-Check (CRC) value computed prior to transmission. The 32-bit FCS is based on the CRC-32 definition. All data after the header frame check sequence through the end of the payload field is included in the CRC calculation. If an error is detected, the frame will not be promoted to the next level of protocol, nor will a Link Layer Acknowledgement packet be generated. In various embodiments, CRC calculations are accomplished before encoding at the source and after decoding at the destination.

The present example protocol includes a Media Access Control (MAC) Sub-Layer. The Media Access Control (MAC) sub-layer is responsible for transmitting data packets to and from nodes across a shared channel. The MAC sub-layer utilizes the node transmission and node wakeup protocols to ensure that packets sent from different stations across a channel do not collide and are received. In addition, the MAC sub-layer is also responsible for the reception of packets from the channel. In one application, a node is required to conserve power and thus is not constantly available for packet reception. Thus, the MAC sub-layer utilizes the node monitoring and node sleep protocols to coordinate the reception of a packet.

The present example protocol involves Node Transmission. Because of the simplex operation of the present wireless communication protocol, a node is unable to detect the channel and transmit simultaneously which means a node is not able to perform collision detection. Therefore, if two nodes transmit concurrently the two transmissions will interfere (at least for nodes within range of both transmitting nodes). In order to minimize collisions and maximize data throughput a shared medium requires a carrier sense multiple access protocol (CSMA). CSMA represents a "listen before talk" policy, in which a node which desires to transmit probes the medium before transmission to determine whether another node is transmitting. One application using the protocol of the present subject matter involves the definition of multiple CSMA protocols. Varying CSMA protocols enable varying devices to communicate in the presence of interferers.

One application of the present subject matter involves two different types of devices: a hearing instrument (i.e. hearing aid); and a hearing instrument accessory. In various embodiments, a hearing instrument will either automatically transmit a packet or perform the CSMA protocol when attempting the transmission of a packet. The protocol identifier of the packet being transmitted is used as the key to determining if a packet is transmitted automatically or the CSMA/CA protocol is performed. For bidirectional voice and one-way streaming audio protocol identifiers a hearing instrument accessory will automatically transmit the packet. For all other protocol identifiers a hearing instrument accessory will perform the CSMA/CA protocol when transmitting the packet. The CSMA/CA protocol is designed to accommodate hearing instruments performing the CSMA protocol. However, with the CSMA/CA protocol the possibility exists that packets could collide. This situation is handled by having a hearing instrument accessory utilize the Static Automatic Repeat Request (ARQ) algorithm on subsequent retransmission attempts.

Figure 15:
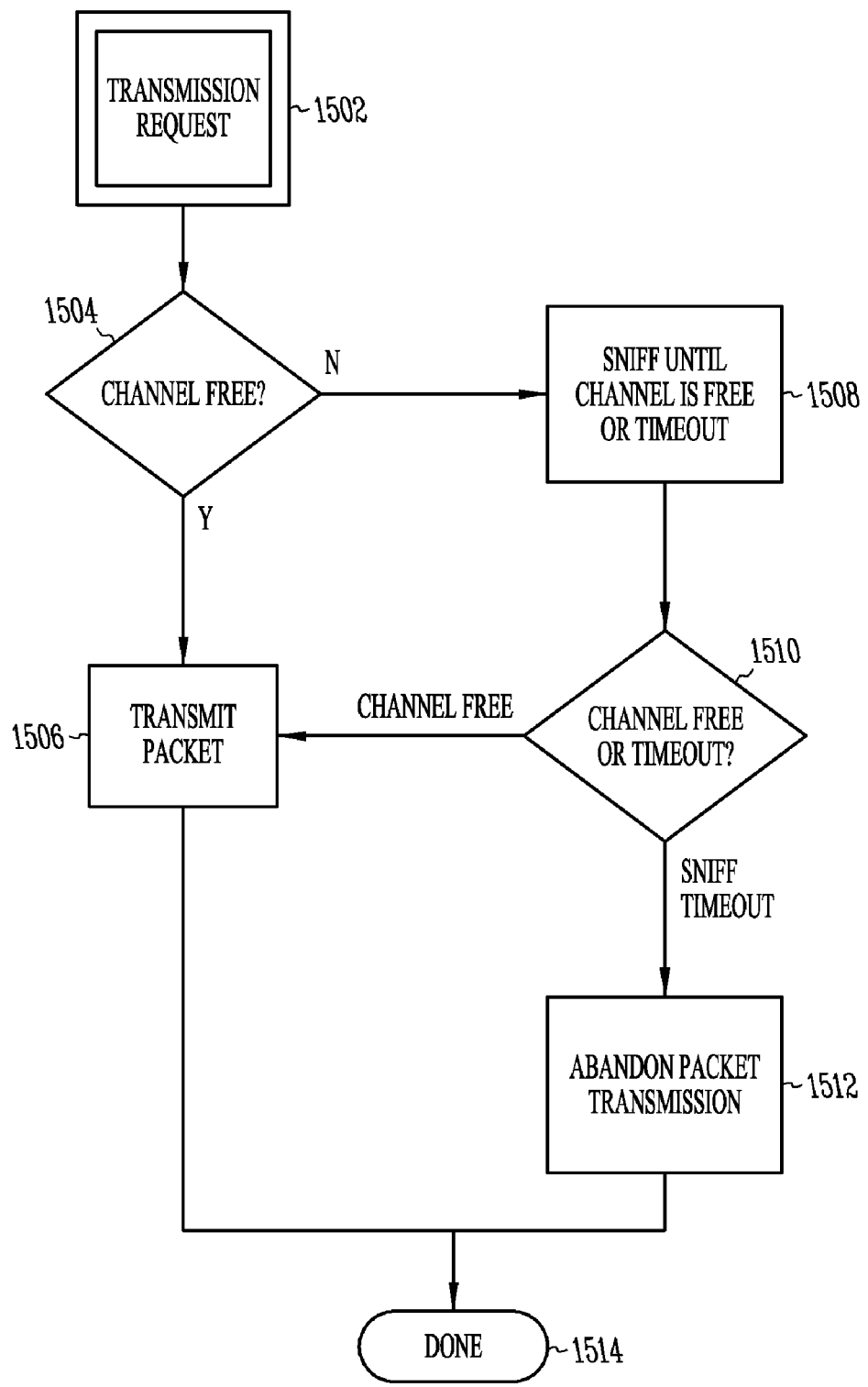

The present example protocol includes a Carrier Sense Multiple Access (CSMA). Attempts to transmit a frame follow the algorithm described in FIG. 15. In various embodiments, the algorithm begins with a transmission request 1502. The method also includes a channel free inquiry 1504. If the channel is free, the algorithm transmits the packet 1506 and finishes 1514.

If the channel is not free, the method sniffs until a channel is free or a timeout occurs 1508. Then the method senses a channel free or a timeout 1510. If the channel is free, it transmits a packet 1506. If it is not, a sniff timeout occurs, and the process abandons the packet transmission 1512. The process then finishes 1514. An example sniff timeout is listed in table 11.

This method is one embodiment of the present subject matter. The present subject matter additionally includes sequences omitting steps. The present subject matter also includes sequences which have varied order as compared to the present example.

It is noted that each node implementing this algorithm provides the ability for this algorithm to be enabled and disabled. The default/initial state is enabled.

TABLE 11

| Parameter name | Description | Range/Value |
|---|---|---|
| Sniff Timeout | The time period used to abandon channel sniffing in case of a prolonged interferer. | 320 mSecs<br>Value calculated by adding the amount of time it will take a node to transmit the largest size packet, allowed based on the size field in the data link PDU with FEC, to the node wakeup time (70 mSecs + 250 mSecs). | transmission of a packet. The protocol identifier of the packet being transmitted is used as the key to determining if a packet is transmitted automatically or the CSMA protocol is performed. For bi-directional voice and one-way streaming audio protocol identifiers a hearing instrument will automatically transmit the packet. For all other protocol identifiers a hearing instrument will perform the CSMA protocol when transmitting the packet. The CSMA protocol is designed to give the packets sent by a hearing instrument the best chance of being delivered successfully in the presence of an interferer. However, in various embodiments using the CSMA protocol, multiple hearing instruments can attempt to transmit at the same time and cause a collision. This situation will is resolved by having a hearing instrument utilize a Random Automatic Repeat Request (ARQ) algorithm which will provide a collision avoidance technique on subsequent retransmission attempts.

A hearing instrument accessory will either automatically transmit a packet or perform the CSMA/CA protocol when The asynchronous nature of packets available for transmission, physical location and/or signal strength of a node may lead to situations where two nodes transmit at the same time and corrupt packets at the receiver. This situation is handled by any automatic repeat request algorithm being used by a node.

Figure 16:
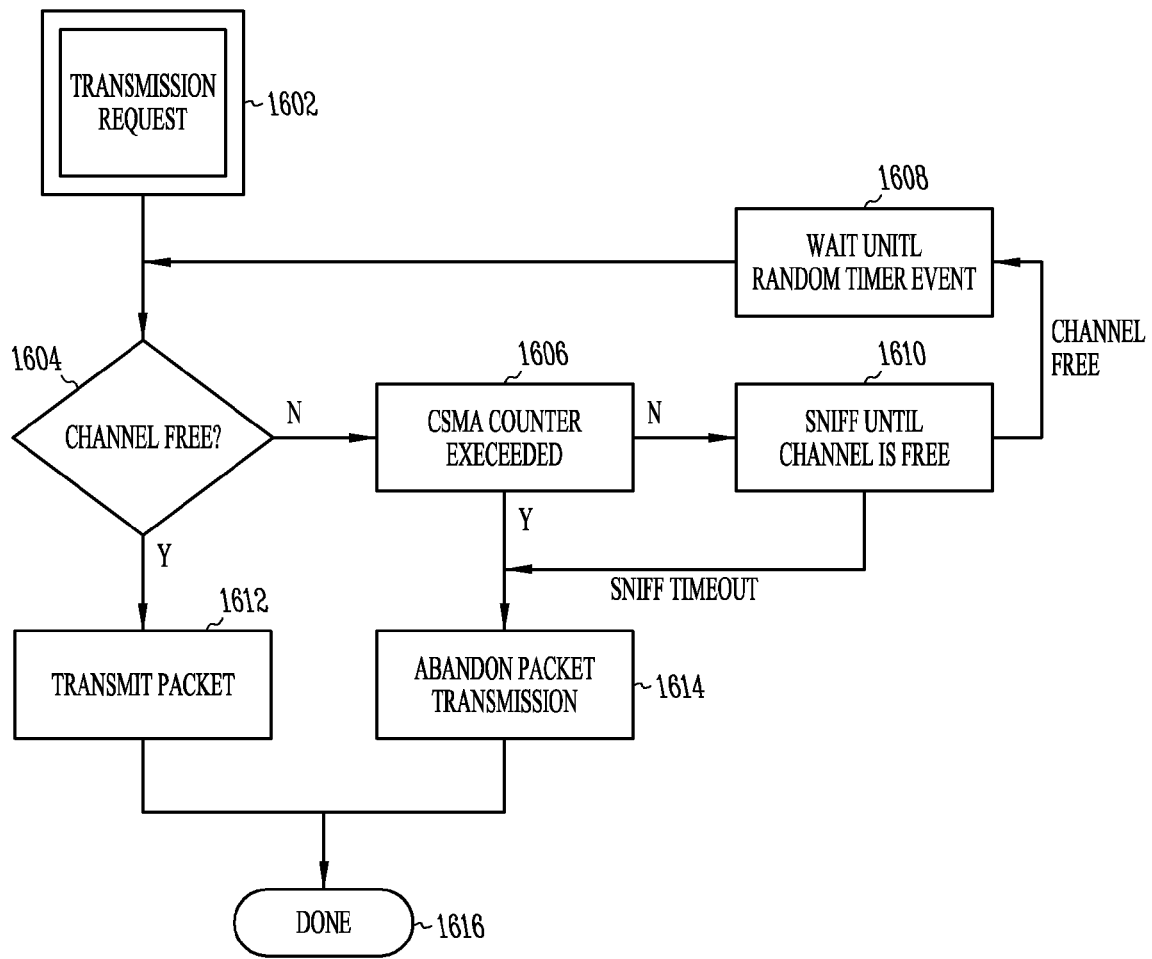

The present example protocol includes a Carrier Sense Multiple Access with Collision Avoidance (CSMA/CA), illustrated in FIG. 16. Table 12 demonstrates example parameters for that algorithm. The CA extension to the base CSMA algorithm, for hearing instrument accessories, introduces a back off procedure. A station that senses the medium is busy defers until the medium is free. Since multiple stations could be waiting for access, there is a higher probability of collisions immediately after the medium becomes free. In order to reduce collisions during this period, a node should generate a random back off time.

In various embodiments, the method begins with a transmission request 1602. The method proceeds to a channel free query 1604. An affirmative response advances to a packet transmission 1612, and then to a termination 1616. A negative response queries if a CSMA counter has been exceeded 1606. If so, the process abandons the packet transmission. Of no, the process proceeds to sniff until a channel is free. This process terminates in one of two ways: 1) a sniff timeout advances to an abandon packet transmission 1614 and then to process termination 1616; 2) a free channel accesses a random timer for an event 1608, and then returns to the channel free query 1604.

Each node implementing this algorithm should provide the ability for this algorithm to be enabled and disabled. The default/initial state is enabled.

TABLE 12

| Parameter name | Description | Range/Value |
| --- | --- | --- |
| Random Timer | The 'random' time period to wait before re-checking the channel for activity and deciding to transmit or not. | The duration of the timer should be a randomly picked value from the following set: {2, 4, 6, 8, 10, 12, 14, 16} mSecs This range of values should accommodate the turn around time from receive to transmit for a node. This value is estimated to be around 1.6 mSecs. |
| CSMA counter | The number of times sniffing for a free channel is invoked. | {1, 2} |
| Sniff timer | The time period used to abandon channel sniffing in case of a prolonged interferer. | 320 mSecs This value is calculated by adding the amount of time it will take a node to transmit the largest size packet, allowed based on the size field in the data link PDU with FEC, to the node wakeup time (70 mSecs + 250 mSecs). |

Figure 17:
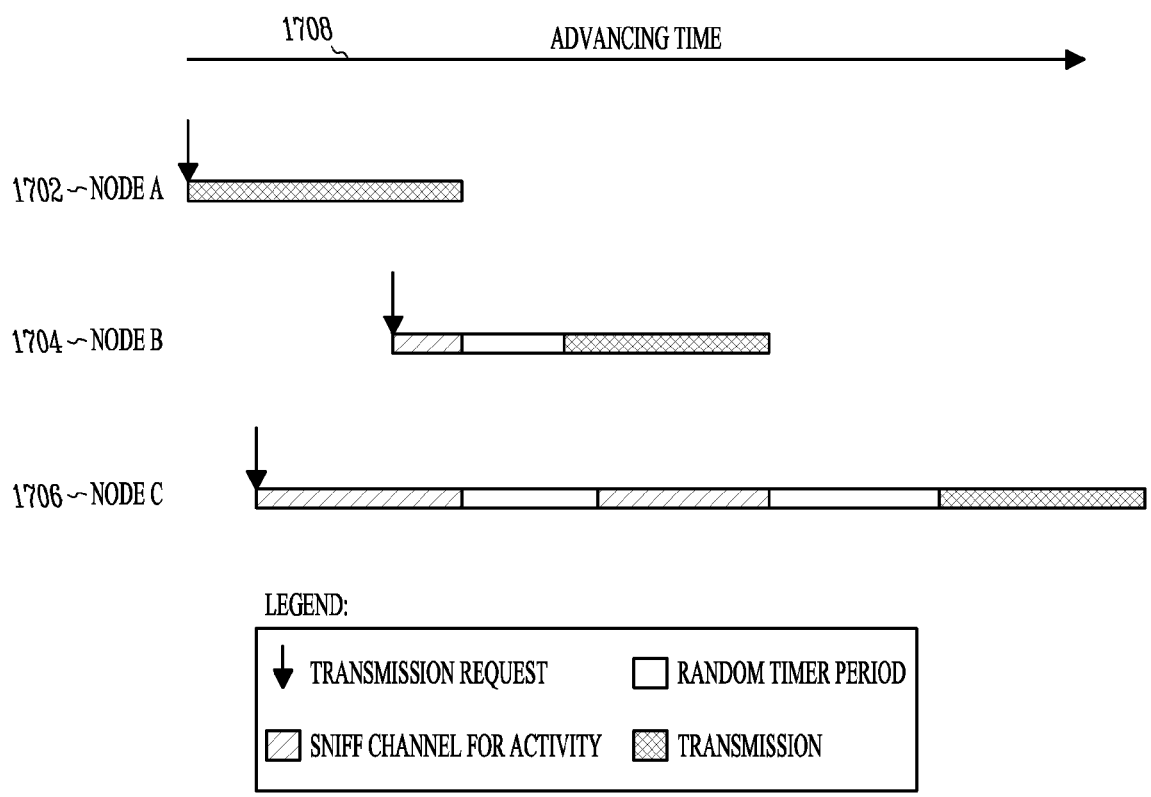
FIG. 17 shows various request timings of the system according to one embodiment of the present subject matter.

The present example protocol includes various algorithms. An algorithm using three nodes is illustrated in FIG. 17. The illustration shows that over time 1708, node A 1702, node B 1704, and node C 1706 experience timing adjustment according to algorithms of the present subject matter. The physical location and/or signal strength of a node may lead to situations where transmitting nodes are not visible to all nodes. This may lead to situations where two nodes transmit at the same time and corrupt packets at the receiver. This situation is handled by any automatic repeat request algorithm being used by a node.

The present example protocol includes a Node Wakeup function. The node wakeup is used by a node with an outbound packet to ensure that one or more destination nodes are awake and ready to receive a packet. The transmitting node maybe required to transmit a wakeup sequence prior to the packet. The wakeup sequence consists of continuously transmitting the preamble for $T_R$ milliseconds. This variable is demonstrated in Table 13. The wakeup sequence is only required if the transmitting node has not had any communication with the destination node within the interval specified through programming. The present subject matter includes a node sleep function that specifies an interval. If the node has had communication, the transmitting node can transmit the normal preamble prior to a packet.

TABLE 13

| Parameter Name | Description | Value |
| --- | --- | --- |
| $T_R$ | The time period for which continuous preamble should be transmitted to wakeup a node. | 255 milliseconds |

The present example protocol includes a Node Monitoring function. This function includes variables illustrated in Table 14. In order for a node to receive a packet it will need to periodically wakeup and monitor the channel. A receiving node is required to wakeup periodically every $T_R$ milliseconds. Then perform an initial monitoring for $T_{dwell}$ milliseconds on the channel looking for activity to determine if a node is attempting to transmit. If no activity is detected on the channel during the initial monitoring then a node will go back to sleep until the next periodic wakeup time in $T_R-T_{dwell}$ milliseconds. If there is activity detected on the channel during the initial monitoring then a node should continue to monitor the channel for $T_R$ milliseconds. If a node receives a packet during extended monitoring then it should perform the procedure described in Section 0 The present example protocol includes a Node Sleep. If a node does not receive a packet during extended monitoring then at the end of the extended monitoring interval the node should start this procedure over by performing an initial monitoring for $T_{dwell}$ milliseconds on the channel looking for activity.

TABLE 14

| Parameter Name | Description | Value |
| --- | --- | --- |
| $T_R$ | The periodic time interval which a node should wakeup. | 250 milliseconds |
| $T_{dwell}$ | The time period for which a node should continuously monitor for activity on the channel. | <1 millisecond |

The present example protocol includes a Node Sleep function. Parameters for this function are demonstrated in Table 15. After the successful reception of a packet and the transmission of an acknowledgement if necessary a node should remain awake to facilitate receiving subsequent packets. A node is required to remain awake and listening for additional packets for $8*T_R$ milliseconds. If during this time interval a subsequent packet is received the time to remain awake will need to be reset.

TABLE 15

| Parameter Name | Description | Value |
|---|---|---|
| $T_R$ | The periodic time interval which a node should wakeup. | 250 milliseconds |

The present example protocol includes a Logical Link Control Sub-Layer. The Logical Link Control sub-layer of the data link layer manages communications between devices over a single link of a network. This sub-layer allows multiple higher-layer protocols to share a single physical data link. This sub-layer will support only connectionless services used by higher-layer protocols.

The present example protocol includes a Static Automatic Repeat Request (ARQ). Associated parameters are listed in Table 16. The data link layer relies on error detection and retransmission to successfully transmit a packet. For packets which require a link layer acknowledgement, the link layer acknowledgement packet should be received within the 'Ack Wait Timer' period. If not the original packet is retransmitted. The maximum number of times a packet is retransmitted is limited to 'Max Number of Retransmissions'.

The requirement of a link layer acknowledgement for a packet can result in the retransmission of a message; a retransmission occurs due to a failing acknowledgement. The filtering of retransmissions at a destination node is required to prevent a destination node from processing the same message more then once. The sequence number (SEQN) field in a packet allows a destination to discard any correctly received retransmissions, as discussed herein.

TABLE 16

| Parameter name | Description | Range |
|---|---|---|
| Ack Wait Timer | The period to wait before a packet is retransmitted. | 100 mSecs NOTE: This timer is started after the successful transmission of the packet. |
| Max Number of Retransmissions | The maximum number of times a packet is retransmitted, in case an ACK is required but not received. | {1, 2, 3} |

The present example protocol includes a Random Automatic Repeat Request (ARQ). Associated parameters are listed in Table 17. The data link layer relies on error detection and retransmission to successfully transmit a packet. For packets which require a link layer acknowledgement, the link layer acknowledgement packet should be received within the 'Ack Wait Timer' period. If not the original packet is retransmitted. The maximum number of times a packet is retransmitted is limited to 'Max Number of Retransmissions'.

The requirement of a link layer acknowledgement for a packet can result in the retransmission of a message; a retransmission occurs due to a failing acknowledgement. The filtering of retransmissions at a destination node is required to prevent a destination node from processing the same message more then once. The sequence number (SEQN) field in a packet allows a destination to discard any correctly received retransmissions, as discussed herein.

TABLE 17

| Parameter name | Description | Range |
|---|---|---|
| Ack Wait Timer | The 'random' time period to wait before a packet is retransmitted | The duration of this timer should include the ARQ wait time plus a randomly picked value from the following set: 100 mSecs + {2, 4, 6, 8, 10, 12, 14, 16} mSecs NOTE: This timer is started after the successful transmission of the packet. |
| Max Number of Retransmission | The maximum number of times a packet is retransmitted, in case an ACK is required but not received. | {1, 2, 3} |

The present example protocol includes a Logical Channels. Centered on the selected channel bank is a group of 6 physical channels. Each physical channel in a bank should be viewed as a logical channel with logical channel 1 being associated with the lowest frequency physical channel and logical channel 6 being associated with the highest frequency physical channel. Logical channel 3 in each band is reserved for use as a control channel and for small amounts of data transfer. The dedication of a control channel is needed to reduce the time needed to monitor, tune and discover a potential communication device across all logical channels. Logical channel 3 is used as it is in the middle of the band, making it quicker to tune to any of the other channels due to its central location.

Channel 3 is used for the exchange of programming data, ear-to-ear information and also to exchange messages instructing a node to tune to a different logical channel for the exchange of bi-directional voice data and one-way streaming audio data. Due to the greater receiver sensitivity of a hearing instrument accessory compared with a hearing instrument, various applications do not perform a true channel negotiation process. In one application, a hearing instrument accessory determines the best possible channel. Then send that channel to the hearing instrument and the hearing instrument will simply acknowledge the channel selected.

The present example protocol includes methods and apparatus to monitor Channel Availability. Associated parameters are illustrated in Table 18. A channel's availability is determined by monitoring the channel for a fixed interval of time. If at any point during the monitoring interval activity is detected the channel is assumed to be in use. If no activity is detected during the monitoring interval the channel is assumed to be idle. The duration of the monitoring interval should be long enough to insure it will detect a channel is in use by any higher-layer protocols and detect any known interferers. For one application this time interval has been determined to be $T_{mon}$ milliseconds.

TABLE 19

| PDU Description | Length (bytes) | Opcode (byte) | Contents | Position in payload |
|---|---|---|---|---|
| Accept | 1 | 0x01 | — | |
| Reject | 1 | 0x02 | — | |
| One-Way Streaming Start Session | 8 | 0x03 | Channel | 2 |
| | | | CodecID | 3 |
| | | | CodecFs | 4 |
| | | | BitRate | 5 |
| | | | Samples/Packet | 6 |
| | | | Multicast Address | 8 |
| | | | Options | 12 |
| One-Way Streaming Stop Session | 1 | 0x04 | — | |
| Bi-Directional Streaming Start Session | 8 | 0x05 | Channel | 2 |
| | | | CodecID | 3 |
| | | | CodecFs | 4 |
| | | | BitRate | 5 |
| | | | Samples/Packet | 6 |
| | | | Multicast Address | 8 |
| | | | Options | 12 |
| Bi-Directional Streaming Stop Session | 1 | 0x06 | — | |
| Channel Change Request | 2 | 0x07 | Channel | 2 |

The present example protocol includes a One-Way Streaming Start Session Request/Response. Table 20 is the format of a One-Way Streaming Start Session Request PDU.

TABLE 20

| | | Address | | | | Header | | | | |
|---|---|---|---|---|---|---|---|---|---|---|
| Size | Frame Desc | Dest Vendor | Dest Device ID | Src Vendor | Src Device ID | Seq Num | PFE | Frame Check Seq | Payload | Payload Checksum |
| 0x0C | 00001001b | 001b | 0x112233 | 001b | 0x123456 | 00b | 1b | 0xXXXX | See Table 21 | 0xXXXX |

TABLE 18

| Parameter Name | Description | Value |
|---|---|---|
| $T_{mon}$ | The time interval which a node should monitor a channel to determine channel availability. | 10 milliseconds |

In one application, a hearing instrument accessory is the only node to perform the channel availability procedure. This is a result of the hearing instrument accessory receiver being more sensitive to channel activity than a hearing instrument receiver.

The present example protocol includes a Media Access Protocol. The media access protocol is used to negotiate an available logical channel within a bank for additional data exchange. Table 19 lists the requests/responses supported by the media access protocol.

Size=0x0C, Number of bytes in the payload
Frame Descriptor—
    Bit 7—Version=0b
    Bit 6—Embedded Data=0b
    Bit 5—Ack Flag=0b, No Acknowledgement
    Bits 4-3—Payload FCS Mode=01, 16-bit length CRC
    Bits 2-0—Frame Type=001b, Media Access Protocol
Address—
    Destination Vendor=001b, Organization 1
    Destination Device ID=0x112233, Vendor specific value
    Source Vendor=001b, Organization 1
    Source Device ID=0x123456, Vendor specific value
Sequence Number—00b
Payload FEC Enable—1b
Header Frame Check Sequence—0xXXXX (16 bit CRC)
Payload—See Table 21
Payload Frame Check Sequence—0xXXXX (16 bit CRC)

Table 21 provides the detailed format of the "payload" field:

TABLE 21

| Request Opcode | Channel | Codec ID | Codec Fs | BitRate | Samples/ Packet | Multicast Address | | Options |
|---|---|---|---|---|---|---|---|---|
| | | | | | | Vendor ID | Device ID | |
| 0x03 | 0x04 | 0x02 | 0x05 | 0x08 | 0x0205 | 001b | 0x300001 | 00000000b |

Request Opcode—0x03, One-Way Streaming Start Session Request
Channel—0x04, Channel Identifier
CodecID—0x02, Defines the codec used to encode the audio stream. Please refer to Table 58 for a complete list of codec identifiers.
CodecFs—0x05, Defines the sampling rate used to encode the audio stream. Please refer to Table 60 for a complete list of sampling rate frequencies.
BitRate—0x08, Defines the number of bits per sample. Please refer to Table 59 for a complete list of bit rates.
Samples/Packet—0x0205, Defines the number of samples sent in each transmission packet.
Multicast Address—0x01300001 Vendor ID=001b Device ID=0x300001 (Vendor specific value)
Options—00000000b, See Table 22 for a description of the one-way streaming options.

The Options field is a bit field that identifies configuration options associated with the audio data stream. The options are shown in Table 22.

TABLE 22

| Bit Position | Description |
|---|---|
| Bit 0 | 0 - Play samples as received |
| | 1 - Collect samples into a complete audio frame before playing |
| Bit 1 | 0 - Disable Error Concealment in the Audio Decoder |
| | 1 - Enable Error Concealment in the Audio Decoder |
| Bits 2–7 | Reserved |

Table 23 is the format of an accept or reject response PDU.

TABLE 23

| | | Address | | | | Header | | | | |
|---|---|---|---|---|---|---|---|---|---|---|
| Size | Frame Desc | Dest Vendor | Dest Device ID | Src Vendor | Src Device ID | Seq Num | PFE | Frame Check Seq | Resp Opcode | Payload Checksum |
| 0x01 | 00001001b | 001b | 0x123456 | 001b | 0x112233 | 00b | 1b | 0xXXXX | 0x01 or 0x02 | 0xXXXX |

Size—0x01, Number of bytes in the payload
Frame Descriptor—
    Bit 7—Version=0b
    Bit 6—Embedded Data=0b
    Bit 5—Ack Flag=0b, No Acknowledgement
    Bits 4-3—Payload FCS Mode=01, 16-bit length CRC
    Bits 2-0—Frame Type=001b, Media Access Protocol
Address—
    Destination Vendor=001b, Organization 1
    Destination Device ID=0x123456, Vendor specific value
    Source Vendor=001b, Organization 1
    Source Device ID=0x112233, Vendor specific value
Sequence Number—00b
Payload FEC Enable1b
Header Frame Check Sequence—0xXXXX (16 bit CRC)
Response Opcode—0x01, Accept Response OR 0x02 Reject Response
Payload Frame Check Sequence—0xXXXX (16 bit CRC)

The present example protocol includes a One-Way Streaming Stop Session Request/Response. Table 24 is the format of a One-Way Streaming Stop Session Request PDU.

TABLE 24

| Size | Frame Desc | Address | | | | Seq Num | PFE | Header Frame Check Seq | Request Opcode | Payload Checksum |
| --- | --- | --- | --- | --- | --- | --- | --- | --- | --- | --- |
| | | Dest Vendor | Dest Device ID | Src Vendor | Src Device ID | | | | | |
| 0x01 | 00001001b | 001b | 0x112233 | 001b | 0x123456 | 00b | 1b | 0xXXXX | 0x04 | 0xXXXX |

Size—0x01, Number of bytes in the payload
Frame Descriptor—
  Bit 7—Version=0b
  Bit 6—Embedded Data=0b
  Bit 5—Ack Flag=0b, No Acknowledgement
  Bits 4-3—Payload FCS Mode=01, 16-bit length CRC
  Bits 2-0—Frame Type=001b, Media Access Protocol
Address—
  Destination Vendor=001b, Organization 1
  Destination Device ID=0x112233, Vendor specific value
  Source Vendor=001b, Organization 1
  Source Device ID=0x123456, Vendor specific value
Sequence Number—00b
Payload FEC Enable—1b
Header Frame Check Sequence—0xXXXX (16 bit CRC)
Response Opcode—0x04, One-Way Streaming Stop Session Request
Payload Frame Check Sequence—0xXXXX (16 bit CRC)

Table 25 is the format of an accept or reject response PDU.

TABLE 25

| Size | Frame Desc | Address | | | | Seq Num | PFE | Header Frame Check Seq | Resp Opcode | Payload Checksum |
| --- | --- | --- | --- | --- | --- | --- | --- | --- | --- | --- |
| | | Dest Vendor | Dest Device ID | Src Vendor | Src Device ID | | | | | |
| 0x01 | 00001001b | 001b | 0x123456 | 001b | 0x112233 | 00b | 1b | 0xXXXX | 0x01 or 0x02 | 0xXXXX |

Size—0x01, Number of bytes in the payload
Frame Descriptor—
  Bit 7—Version=0b
  Bit 6—Embedded Data=0b
  Bit 5—Ack Flag=0b, No Acknowledgement
  Bits 4-3—Payload FCS Mode=01, 16-bit length CRC
  Bits 2-0—Frame Type=001b, Media Access Protocol
Address—
  Destination Vendor=001b, Organization 1
  Destination Device ID=0x123456, Vendor specific value
  Source Vendor=001b, Organization 1
  Source Device ID=0x112233, Vendor specific value
Sequence Number—00b
Payload FEC Enable—1b
Header Frame Check Sequence—0xXXXX (16 bit CRC)
Response Opcode—0x01, Accept Response OR 0x02 Reject Response
Payload Frame Check Sequence—0xXXXX (16 bit CRC)

The present example protocol includes a Bi-Directional Streaming Start Session Request/Response. Table 26 is the format of a Bi-Directional Streaming Start Session Request PDU.

TABLE 26

| Size | Frame Desc | Address | | | | Seq Num | PFE | Header | | |
| | | Dest Vendor | Dest Device ID | Src Vendor | Src Device ID | | | Frame Check Seq | Payload | Payload Checksum |
|---|---|---|---|---|---|---|---|---|---|---|
| 0x0C | 00001001b | 001b | 0x112233 | 001b | 0x123456 | 00b | 1b | 0xXXXX | See Table 27 | 0xXXXX |

Size=0x0C, Number of bytes in the payload
Frame Descriptor—
  Bit 7—Version=0b
  Bit 6—Embedded Data=0b
  Bit 5—Ack Flag=0b, No Acknowledgement
  Bits 4-3—Payload FCS Mode=01, 16-bit length CRC
  Bits 2-0—Frame Type=001b, Media Access Protocol
Address—
  Destination Vendor=001b, Organization 1
  Destination Device ID=0x112233, Vendor specific value
  Source Vendor=001b, Organization 1
  Source Device ID=0x123456, Vendor specific value
Sequence Number—00b
Payload FEC Enable—1b
Header Frame Check Sequence—0xXXXX (16 bit CRC)
Payload—See Table 27
Payload Frame Check Sequence—0xXXXX (16 bit CRC)

Table 27 provides the detailed format of the "payload" field:

TABLE 27

| Request Opcode | Channel | Codec ID | Codec Fs | BitRate | Samples/ Packet | Multicast Address | | Options |
| | | | | | | Vendor ID | Device ID | |
|---|---|---|---|---|---|---|---|---|
| 0x05 | 0x05 | 0x01 | 0x11 | 0x01 | 0x0080 | 001b | 0x300001 | 00000100b |

Request Opcode—0x05, Bi-Directional Streaming Start Request
Channel—0x05, Channel Identifier
CodecID—0x01, Defines the codec used to encode the audio stream. Please refer to Table 58 for a complete list of codec identifiers.
CodecFs—0x11, Defines the sampling rate used to encode the audio stream. Please refer to Table 60 for a complete list of sampling rate frequencies.
BitRate—0x01, Defines the number of bits per sample. Please refer to Table 59 for a complete list of bit rates.
Samples/Packet—0x0080, Defines the number of samples sent in each transmission packet.
Multicast Address—0x01300001 Vendor ID=001b Device ID=0x300001 (Vendor specific value)
Options—00000100b, See Table 28 for a description of the bi-directional streaming options.

The Options field is a bit field that identifies configuration options associated with the audio data stream. The options are shown in Table 28.

TABLE 28

| Bit Position | Description |
|---|---|
| Bit 0 | 0 - Play samples as received<br>1 - Collect samples into a complete audio frame before playing |
| Bit 1 | 0 - Disable Error Concealment in the Audio Decoder<br>1 - Enable Error Concealment in the Audio Decoder |
| Bit 2 | 0 - Disable Microphone<br>1 - Enable Microphone |
| Bits 3–7 | Reserved |

Table 29 is the format of an accept or reject response PDU.

TABLE 29

| | | Address | | | | | | Header | | |
|---|---|---|---|---|---|---|---|---|---|---|
| Size | Frame Desc | Dest Vendor | Dest Device ID | Src Vendor | Src Device ID | Seq Num | PFE | Frame Check Seq | Resp Opcode | Payload Checksum |
| 0x01 | 00001001b | 001b | 0x123456 | 001b | 0x112233 | 00b | 1b | 0xXXXX | 0x01 or 0x02 | 0xXXXX |

Size—0x01, Number of bytes in the payload
Frame Descriptor—
    Bit 7—Version=0b
    Bit 6—Embedded Data=0b
    Bit 5—Ack Flag=0b, No Acknowledgement
    Bits 4-3—Payload FCS Mode=01, 16-bit length CRC
    Bits 2-0—Frame Type=001b, Media Access Protocol
Address—
    Destination Vendor—001b, Organization 1
    Destination Device ID=0x123456, Vendor specific value
    Source Vendor=001b, Organization 1
    Source Device ID=0x112233, Vendor specific value
Sequence Number—00b
Payload FEC Enable—1b
Header Frame Check Sequence—0xXXXX (16 bit CRC)
Response Opcode—0x01, Accept Response OR 0x02 Reject Response
Payload Frame Check Sequence—0xXXXX (16 bit CRC)

The present example protocol includes a Bi-Directional Streaming Stop Session Request/Response. Table 30 is the format of a Bi-Directional Streaming Stop Session Request PDU.

TABLE 30

| | | Address | | | | | | Header | | |
|---|---|---|---|---|---|---|---|---|---|---|
| Size | Frame Desc | Dest Vendor | Dest Device ID | Src Vendor | Src Device ID | Seq Num | PFE | Frame Check Seq | Request Opcode | Payload Checksum |
| 0x01 | 00001001b | 001b | 0x112233 | 001b | 0x123456 | 00b | 1b | 0xXXXX | 0x06 | 0xXXXX |

Size—0x01, Number of bytes in the payload
Frame Descriptor—
    Bit 7—Version=0b
    Bit 6—Embedded Data=0b
    Bit 5—Ack Flag=0b, No Acknowledgement
    Bits 4-3—Payload FCS Mode=01, 16-bit length CRC
    Bits 2-0—Frame Type=001b, Media Access Protocol
Address—
    Destination Vendor—001b, Organization 1
    Destination Device ID=0x112233, Vendor specific value
    Source Vendor=001b, Organization 1
    Source Device ID=0x123456, Vendor specific value
Sequence Number—00b
Payload FEC Enable—1b
Header Frame Check Sequence—0xXXXX (16 bit CRC)
Request Opcode—0x06, Bi-Directional Streaming Stop Session Request
Payload Frame Check Sequence—0xXXXX (16 bit CRC)

Table 31 is the format of an accept or reject response PDU.

TABLE 31

| | | Address | | | | | | Header | | |
|---|---|---|---|---|---|---|---|---|---|---|
| Size | Frame Desc | Dest Vendor | Dest Device ID | Src Vendor | Src Device ID | Seq Num | PFE | Frame Check Seq | Resp Opcode | Payload Checksum |
| 0x01 | 00001001b | 0x01 | 0x123456 | 0x01 | 0x112233 | 00b | 1b | 0xXXXX | 0x01 or 0x02 | 0xXXXX |

Size—0x01, Number of bytes in the payload
Frame Descriptor—
    Bit 7—Version=0b
    Bit 6—Embedded Data=0b
    Bit 5—Ack Flag=0b, No Acknowledgement
    Bits 4-3—Payload FCS Mode=01, 16-bit length CRC
    Bits 2-0—Frame Type=001b, Media Access Protocol
Address—
    Destination Vendor=001b, Organization 1
    Destination Device ID=0x123456, Vendor specific value
    Source Vendor=001b, Organization 1
    Source Device ID=0x112233, Vendor specific value
Sequence Number—00b
Payload FEC Enable—1b
Header Frame Check Sequence—0xXXXX (16 bit CRC)
Response Opcode—0x01, Accept Response OR 0x02 Reject Response
Payload Frame Check Sequence—0xXXXX (16 bit CRC)

The present example protocol includes a Channel Change Request. Table 32 is the format of a Channel Change Request PDU.

TABLE 32

| Size | Frame Desc | Address | | | | Seq Num | PFE | Header | | | |
|---|---|---|---|---|---|---|---|---|---|---|---|
| | | Dest Vendor | Dest Device ID | Src Vendor | Src Device ID | | | Frame Check Seq | Request Opcode | Payload | Payload Checksum |
| 0x02 | 00001001b | 001b | 0x112233 | 001b | 0x123456 | 00b | 1b | 0xXXXX | 0x07 | 0x04 | 0xXXXX |

Size=0x02, Number of bytes in the payload
Frame Descriptor—
   Bit 7—Version=0b
   Bit 6—Embedded Data=0b
   Bit 5—Ack Flag=0b, No Acknowledgement
   Bits 4-3—Payload FCS Mode=01, 16-bit length CRC
   Bits 2-0—Frame Type=001b, Media Access Protocol
Address—
   Destination Vendor=001b, Organization 1
   Destination Device ID=0x112233, Vendor specific value
   Source Vendor 001b, Organization 1
   Source Device ID=0x123456, Vendor specific value
Sequence Number—00b
Payload FEC Enable—1b
Header Frame Check Sequence—0xXXXX (16 bit CRC)
Request Opcode—0x07—Channel Change Request
Payload—04—Channel Identifier
Payload Frame Check Sequence—0xXXXX (16 bit CRC)
Table 33 is the format of an accept or reject response PDU.

TABLE 33

| Size | Frame Desc | Address | | | | Seq Num | PFE | Header | | |
|---|---|---|---|---|---|---|---|---|---|---|
| | | Dest Vendor | Dest Device ID | Src Vendor | Src Device ID | | | Frame Check Seq | Resp Opcode | Payload Checksum |
| 0x01 | 00001001b | 001b | 0x123456 | 001b | 0x112233 | 00b | 1b | 0xXXXX | 0x01 or 0x02 | 0xXXXX |

Size—0x01, Number of bytes in the payload
Frame Descriptor—
   Bit 7—Version=0b
   Bit 6—Embedded Data=0b
   Bit 5—Ack Flag=0b, No Acknowledgement
   Bits 4-3—Payload FCS Mode=01, 16-bit length CRC
   Bits 2-0—Frame Type=001b, Media Access Protocol
Address—
   Destination Vendor=001b, Organization 1
   Destination Device ID=0x123456, Vendor specific value
   Source Vendor=001b, Organization 1
   Source Device ID=0x112233, Vendor specific value
Sequence Number—00b
Payload FEC Enable—1b
Header Frame Check Sequence—0xXXXX (16 bit CRC)
Response Opcode—0x01, Accept Response OR 0x02 Reject Response
Payload Frame Check Sequence—0xXXXX (16 bit CRC)

The present example protocol includes a Broadcast/Multicast Message Response. In order to avoid frame collisions, when a node receives a valid inbound PDU that has as the destination address, the broadcast address and a response should be sent, each individual node will need to delay their response. This delay value is being used as a collision avoidance mechanism to prevent all nodes that received the broadcast message from all transmitting their response at the same time and causing frame collisions. The delay value is a randomly picked value from the following set {4, 8, 12, 16, 29, 24, 28, 32 mSecs}.

The present example protocol includes a Error Correction/Detection. The error correction/detection functions provide the ability for a receiving node to detect and correct some errors that may have occurred during the transmission of a packet.

The present example protocol includes a Forward Error Correction. A Reed Solomon code is a block-based error correcting code used to correct errors introduced by a communications channel. The Reed Solomon code RS (15, 11) with a 44-bit block is utilized to correct packet errors. Consequently, each block of 44 information bits is encoded into a 60 bit codeword. Since the encoder operates with information segments of length 44, tail bits with value zero may have to be appended at the end of the payload or after the CRC if a message has a CRC. The total number of bits to encode should be a multiple of 44. Thus, the number of tail bits to append is the least possible that achieves this (i.e. in the interval 0 . . . 43). These tail bits are not included in the size field in the header.

A data link PDU will always have forward error correction performed over the Size field thru the Header Frame Check Sequence field. However, depending on the data link PDU Protocol Identifier field a data link PDU may or may not have forward error correction performed over the remainder of a data link PDU. The only Protocol Identifier which will not have forward error correction over the "payload" of a data link PDU is the Bi-Directional Voice protocol identifier.

The present example protocol includes Error Detection functions. The present example protocol includes a CRC-CCITT function. The 16-bit CRC-CCITT uses the polynomial—$X^{16}+X^{12}+X^5+1$. The CRC value is initialized to 0xFFFF prior to computation. The final computed value of the CRC will not be modified by the transmitter or receiver, such as using a ones complemented value. The frame receiver computes the received FCS in the same manner as the transmitter and compares the computed FCS to the received FCS. If the two values match, e frame data was received correctly. The receiver will do a direct comparison of the computed and received CRC values.

The present example protocol includes a CRC-32 function. The 32-bit CRC-32 uses the polynomial—$X^{32}+X^{26}+X^{23}+X^{22}+X^{16}+X^{12}+X^{11}+X^{10}+X^8+X^7+X^5+X^4+X^2+X+1$. The CRC value is initialized to 0xFFFFFFFF prior to computation. The final computed value of the CRC will not be modified by the transmitter or receiver, such as using a ones complemented value. The frame receiver computes the received FCS in the same manner as the transmitter and compares the computed FCS to the received FCS. If the two values match, the frame data was received correctly. The receiver will do a direct comparison of the computed and received CRC values.

The present example protocol includes Higher Level Protocols. There are four higher level protocols currently defined; Hearing Aid Control, Bi-Directional Voice, One-Way Streaming Audio and Extended. The Hearing Aid Control protocol is used to communicate with hearing instruments relative to control and configuration operations, such as fitting functions. The Bi-Directional Voice protocol is used to transmit and receive digital audio data to and from a hearing instrument(s). The One-Way Streaming Audio protocol is used to transmit one-way digital audio data to a hearing instrument(s). The Extended protocol is used to provide access to additional network service protocols.

The present example protocol includes a Hearing Aid Control Protocol. The Hearing Aid Control protocol is used to communicate programming information used by a fitting application, manufacturing application, or other similar type of application to a hearing instrument(s). The PDU frame format used to communicate hearing aid data to a hearing instrument will appear as follows in Table 34:

TABLE 34

| | | Address | | | | | Header | | Payload |
|---|---|---|---|---|---|---|---|---|---|
| Size | Frame Desc | Dest Vendor | Dest Device ID | Src Vendor | Src Device ID | Seq Num | PFE | Frame Check Seq | Hearing Aid Data | Frame Check Sequence |
| 0xC | 00110010b | 001b | 0x112233 | 001b | 0x123456 | 01b | 1b | 0xXXXX | 0xAABBCCDD1122334455667788 | 0xXXXXXXXX |

Size=0xC, Number of bytes in the payload

Frame Descriptor—

Bit 7—Version=0b

Bit 6—Embedded Data=0b

Bit 5—Ack Flag=1b, Acknowledge

Bits 4-3—Payload FCS Mode=10, 32 bit payload CRC

Bits 2-0—Frame Type=010b, Hearing Aid Data

Address—

Destination Vendor=001b, Organization 1

Destination Device ID=0x112233, Vendor specific value

Source Vendor=001b, Organization 1

Source Device ID=0x123456, Vendor specific value

Sequence Number—01b

Payload FEC Enable—1b

Header Frame Check Sequence—0xXXXX (16 bit CRC)

Hearing Aid Data—0xAABBCCDD1122334455667788 (Vendor dependent data)

Payload Frame Check Sequence—0xXXXXXXXX (32 bit CRC)

A Layer 2 acknowledgement packet returned by the destination will appear as follows in Table 35:

TABLE 35

| | | Address | | | | | | Header |
|---|---|---|---|---|---|---|---|---|
| Size | Frame Desc | Dest Vendor | Dest Device ID | Src Vendor | Src Device ID | Seq Num | PFE | Frame Check Sequence |
| 0x00 | 00000000b | 0x01 | 0x123456 | 0x01 | 0x112233 | 01b | 0b | 0xXXXX |

Size=0x00, Number of bytes in the payload
Frame Descriptor—
   Bit 7—Version=0b
   Bit 6—Embedded Data=0b
   Bits 5—Ack Flag=0, No Acknowledgement
   Bits 4-3—Payload FCS Mode=00b, no payload CRC
   Bits 2-0—Frame Type=000b, Acknowledgement
Address—
   Destination Vendor=001b, Organization 1
   Destination Device ID=0x123456, Vendor specific value
   Source Vendor=001b, Organization 1
   Source Device ID=0x112233, Vendor specific value
Sequence Number—01b
Payload FEC Enable—0b
Header Frame Check Sequence—0xXXXX (16 bit CRC)

The present example protocol includes a Bi-Directional Voice Protocol. The Bi-Directional Voice protocol is used to transmit and receive digital audio information. The PDU format used to communicate bi-directional audio information to a hearing instrument(s) will appear as follows in Table 36:

TABLE 36

| Size | Frame Desc | Address |||| Seq Num | PFE | Header |||
|---|---|---|---|---|---|---|---|---|---|---|
| | | Dest Vendor | Dest Device ID | Src Vendor | Src Device ID | | | Frame Check Seq | Payload Audio Codewords | |
| 0x80 | 00000011b | 001b | 0x112233 | 001b | 0x123456 | 00b | 0b | 0xXXXX | — | |

Size=0x80, Number of bytes in the payload
Frame Descriptor—
   Bit 7—Version=0b
   Bit 6—Embedded Data=0b
   Bit 5—Ack Flag=0b, No Acknowledgement
   Bits 4-3—Payload FCS Mode=00, no payload CRC
   Bits 2-0—Frame Type=011b, Bi-Directional Voice Data
Address—
   Destination Vendor=001b, Organization 1
   Destination Device ID=0x112233, Vendor specific value
   Source Vendor=001b, Organization 1
   Source Device ID=0x123456, Vendor specific value
Sequence Number—00b
Payload FEC Enable—0b
Header Frame Check Sequence—0xXXXX (16 bit CRC)
Audio Codewords—Vendor specific values (128 bytes in length)

The present example protocol includes a One-Way Streaming Audio Protocol. The Streaming Audio protocol is used to transmit digital audio information. The PDU format used to communicate streaming audio information to a hearing instrument(s) will appear as follows in Table 37:

TABLE 37

| Size | Frame Desc | Address |||| Seq Num | PFE | Header |||
|---|---|---|---|---|---|---|---|---|---|---|
| | | Dest Vendor | Dest Device ID | Src Vendor | Src Device ID | | | Frame Check Seq | Payload Audio Codewords | |
| 0x205 | 00000100b | 001b | 0x112233 | 001b | 0x123456 | 00b | 1b | 0xXXXX | — | |

Size=0x205, Number of bytes in the payload
Frame Descriptor—
   Bit 7—Version=0b
   Bit 6—Embedded Data=0b
   Bit 5—Ack Flag=0b, No Acknowledgement
   Bits 4-3—Payload FCS Mode=00, no payload CRC
   Bits 2-0—Frame Type=100b, Streaming Audio Data
Address—
   Destination Vendor=001b, Organization 1
   Destination Device ID=0x112233, Vendor specific value
   Source Vendor=001b, Organization 1
   Source Device ID=0x123456, Vendor specific value
Sequence Number—00b
Payload FEC Enable—1b
Header Frame Check Sequence—0xXXXX (16 bit CRC)
Audio Codewords—Vendor specific values (517 bytes in length)

The present example protocol includes an Extended Protocol. The Extended protocol is a mechanism which allows additional network services to utilize the data link and physical layers of the wireless protocol for communication. Examples of extended protocols are described herein.

Extended Protocols

Figure 18:
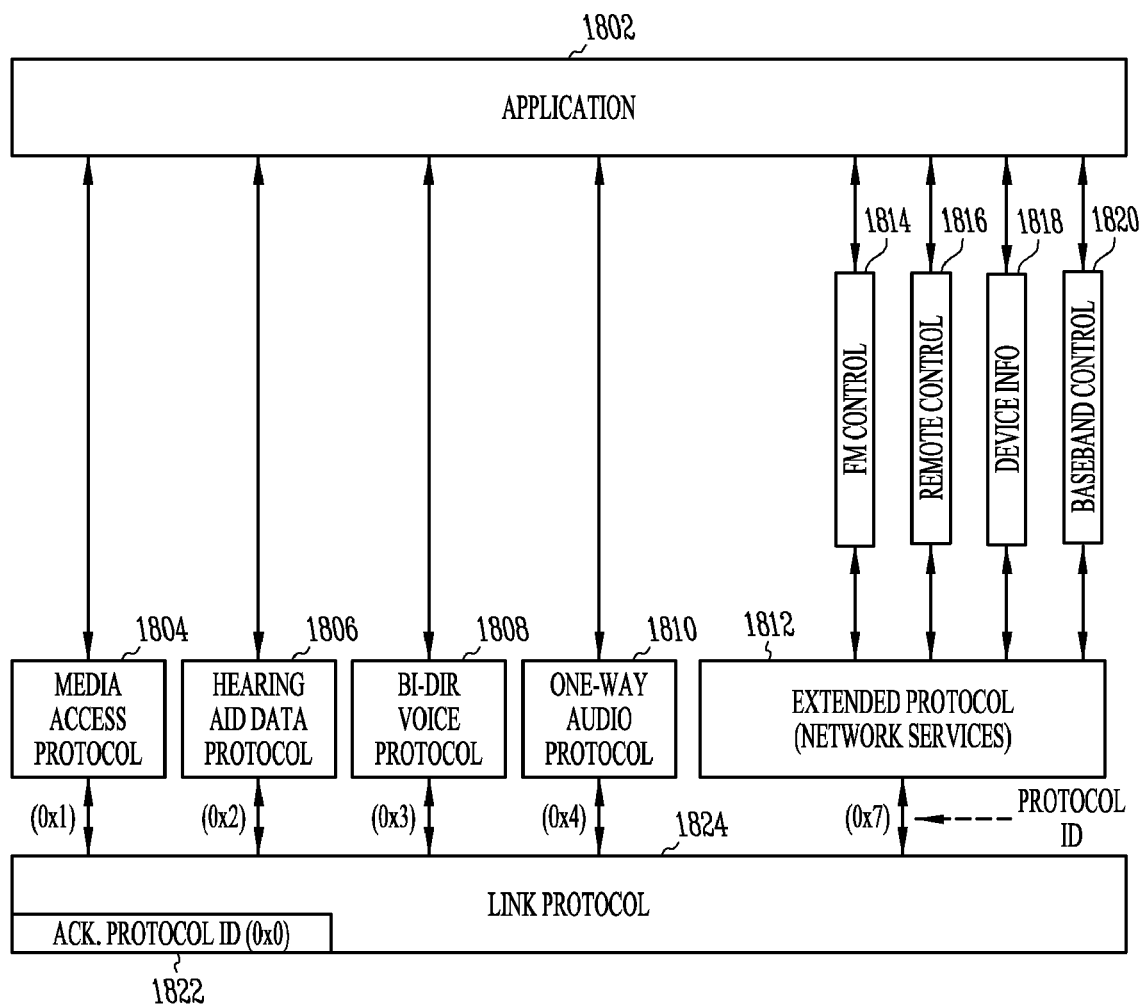
FIG. 18 shows various protocol relationships according to one embodiment of the present subject matter.

FIG. 18 shows the overall structure of various network services which are within the scope of the present subject matter. The illustration shoes an application 1802 which interacts with a media access protocol 1804, a hearing aid data protocol 1806, a bi-directional voice protocol 1808, a one-way audio protocol 1810, an fm control 1814, a remote control 1816, device information 1818, and baseband control 1820. Addtionally, extended protocol (network services) interface with elements 1814-1820, as well as a link protocol 1824. The link protocol, in various embodiments, includes an ack. protocol ID of 0x0. Table 38 provides the list of network service identifiers that are currently defined. Network Service identifiers 0 and 255 are reserved values.

TABLE 38

| Port | Network Service |
|---|---|
| 0x00 | Reserved |
| 0x01 | Baseband Control |
| 0x02 | Device Information |
| 0x03 | Remote Control |

TABLE 38-continued

| Port | Network Service |
|---|---|
| 0x04 | FM Control |
| 0x05–0xFE | Reserved |
| 0xFF | Reserved |

The present example protocol includes a Baseband Control Network Service. The baseband control network service allows the assigning and un-assigning of addresses to a wireless node. Table 39 lists the service requests and responses supported by the baseband control network service.

TABLE 39

| PDU Description | Length (bytes) | Opcode (byte) | Contents | Position in Payload |
|---|---|---|---|---|
| Accept | 1 | 0x01 | — | |
| Reject | 1 | 0x02 | — | |
| Address Assign | 6 | 0x03 | Vendor ID | 2 |
| | | | Device ID | 3–6 |
| Address Un-assign | 6 | 0x04 | Vendor ID | 2 |
| | | | Device ID | 3–6 |

Various baseband control node requests and responses will utilize unicast addresses. If a baseband control request is received with a broadcast or multicast long address in either the source or destination address it is ignored/discarded. Since various baseband requests require a specific baseband response, in some embodiments requests and responses are sent without requiring a link layer acknowledgement.

The present example protocol includes an Address Assign/Un-assign Request/Response. Table 40 is the format of a long address assign/un-assign request PDU.

TABLE 40

| | | Address | | | | | Header | | |
|---|---|---|---|---|---|---|---|---|---|
| Size | Frame Desc | Dest Vendor | Dest Device ID | Src Vendor | Src Device ID | Seq Num | PFE | Frame Check Seq | Payload | Payload Checksum |
| 0x06 | 00001111b | 001b | 0x112233 | 001b | 0x123456 | 00b | 1b | 0xXXXX | See Table 41 | 0xXXXX |

Size=0x06, Number of bytes in the payload
Frame Descriptor—
    Bit 7—Version=0b
    Bit 6—Embedded Data=0b
    Bit 5—Ack Flag=0b, No Acknowledgement
    Bits 4-3—Payload FCS Mode=01, 16-bit length CRC
    Bits 2-0—Frame Type=111b, Extended Protocol Address—
    Destination Vendor=001b, Organization 1
    Destination Device ID=0x112233, Vendor specific value
    Source Vendor=001b, Organization 1
    Source Device ID=0x123456, Vendor specific value
Sequence Number—00b
Payload FEC Enable—1b
Header Frame Check Sequence—0xXXXX (16 bit CRC)
Payload—See Table 41
Payload Frame Check Sequence—0xXXXX (16 bit CRC)

Table 41 provides the detailed format of the "payload" field:

TABLE 41

| Network Service ID | Request Opcode | Vendor ID | Device ID |
|---|---|---|---|
| 0x01 | 0x03 or 0x04 | 001 | 0x000001 |

Network Service ID—0x03, Baseband Control Network Service
    Request Opcode—0x03 or 0x04, Assign/Unassign Address Request
    Vendor ID—001b, Vendor ID of the address
    Device ID—0x000001, Device ID of the address
Table 42 is the format of an accept or reject response PDU.

TABLE 42

| | | Address | | | | | | | | |
|---|---|---|---|---|---|---|---|---|---|---|
| Size | Frame Desc | Dest Vendor | Dest Device ID | Src Vendor | Src Device ID | Seq Num | PFE | Header Frame Check Seq | Network Service ID | Resp Opcode | Payload Checksum |
| 0x02 | 00001111b | 001b | 0x123456 | 001b | 0x112233 | 00b | 1b | 0xXXXX | 0x01 | 0x01 or 0x02 | 0xXXXX |

Size—0x02, Number of bytes in the payload
Frame Descriptor—
    Bit 7—Version=0b
    Bit 6—Embedded Data=0b
    Bit 5—Ack Flag=0b, No Acknowledgement
    Bits 4-3—Payload FCS Mode=01, 16-bit length CRC
    Bits 2-0—Frame Type=111b, Extended Protocol Address—
  Destination Vendor=001b, Organization 1
  Destination Device ID=0x123456, Vendor specific value
  Source Vendor=001b, Organization 1
  Source Device ID=0x112233, Vendor specific value
Sequence Number—00b
Payload FEC Enable—1b
Header Frame Check Sequence—0xXXXX (16 bit CRC)
Network Service ID—0x01, Baseband Control Network Service
Response Opcode—0x01, Accept Response OR 0x02 Reject Response
Payload Frame Check Sequence—0xXXXX (16 bit CRC)

The present example protocol includes a Device Info Network Service. The device info network service allows for wireless node discovery and wireless node information retrieval. Table 43 lists the service requests and responses supported by the device info network service.

The ping requests and responses (opcodes 0x01-0x06) are used to obtain the primary long address of nodes within range. The left and right versions are used to request addresses of left and right assigned nodes, respectively. Thus, if a node is defined as left, then it should use the 'Ping Reply from a left HA' (0x05) response to both the Ping (0x01) and 'Ping for a left HA' (0x02) request, and it should not respond to the 'Ping for a right HA' (0x03) request. Nodes that do not have left or right assignments should respond with a 'Ping Reply' (0x04) response.

The remaining requests and responses are used to retrieve additional information from a wireless node.

TABLE 43

| PDU Description | Length (bytes) | Opcode (byte) | Contents | Position in Payload |
|---|---|---|---|---|
| Ping | 1 | 0x01 | — | |
| Ping for a left HA | 1 | 0x02 | — | |
| Ping for a right HA | 1 | 0x03 | — | |
| Ping reply | 2 + (Vendor Data Length) | 0x04 | Vendor Data Length | 2 |
| | | | Vendor Data | 3 |
| Ping reply from a left HA | 3 | 0x05 | Vendor Data Length | 2 |
| | | | Vendor Data | 3 |
| Ping reply from a right HA | 3 | 0x06 | Vendor Data Length | 2 |
| | | | Vendor Data | 3 |
| Address Info Request | 1 | 0x07 | — | |
| Address Info Reply | 2 + (4 * Addr Count) | 0x08 | Addr Count | 2 |
| | | | Addresses | 3 |
| Extended device information request | 1 | 0x09 | — | |
| Extended device information reply | 23 | 0x0a | Device ID | 2 |
| | | | Device Model | 3–10 |
| | | | Device Serial Number | 11–18 |
| | | | Device Side | 19 |
| | | | Link Version | 20 |
| | | | Link MTU | 21 |
| | | | Link Options | 22 |
| | | | Link Audio | 23 |
| Audio Info Request | 1 | 0x0b | — | |
| Audio Info Reply | 2 + (Stream Count * 2) | 0x0c | Stream Count | 2 |
| | | | List of [Codec Id, Bits/Sample and Frequency] | 3–(Length) |

Device info Ping requests can utilize the broadcast address as the destination address. However, device info Ping responses and all other device info requests and responses should utilize a unicast address for both the source and destination addresses; otherwise, they should be ignored/discarded.

Since all the device info requests require a specific device info response, all requests and responses is sent without requiring a link layer acknowledgement. Finally, due to the wireless protocol and correlating device info control requests/responses, only a single device info control operation can be performed at a time between wireless nodes.

The present example protocol includes a Ping Request/Response. Table 44 demonstrates one format of a Ping Request PDU.

TABLE 44

| Size | Frame Desc | Dest Vendor | Dest Device ID (Address) | Src Vendor | Src Device ID (Address) | Seq Num | PFE | Header Frame Check Seq | Network Service ID | Resp Opcode | Payload Checksum |
|---|---|---|---|---|---|---|---|---|---|---|---|
| 0x02 | 00001111b | 001b | 0xFFFFFF | 001b | 0x123456 | 00b | 1b | 0xXXXX | 0x02 | 0x01, 0x02, or 0x03 | 0xXXXX |

Size=0x02, Number of bytes in the payload
Frame Descriptor—
  Bit 7—Version=0b
  Bit 6—Embedded Data=0b
  Bit 5—Ack Flag=0b, No Acknowledgement
  Bits 4-3—Payload FCS Mode=01, 16-bit length CRC
  Bits 2-0—Frame Type=111b, Extended Protocol
Address—
  Destination Vendor=001b, Organization 1
  Destination Device ID=0xFFFFFF, Broadcast Address
  Source Vendor=001b, Organization 1
  Source Device ID=0x123456, Vendor specific value
Sequence Number—00b
Payload FEC Enable—1b
Header Frame Check Sequence—0xXXXX (16 bit CRC)
Network Service ID—0x02, Device Info Network Service
Request Opcode—0x01 Ping, 0x02 Ping for a Left HA, or 0x03 Ping for a Right HA
Payload Frame Check Sequence—0xXXXX (16 bit CRC)
Table 45 is one format of a Ping Response PDU.

Bits 4-3—Payload FCS Mode=01, 16-bit length CRC
Bits 2-0—Frame Type=111b, Extended Protocol
Address—
  Destination Vendor=001b, Organization 1
  Destination Device ID=0x123456, Vendor specific value
  Source Vendor=001b, Organization 1
  Source Device ID=0x112233, Vendor specific value
Sequence Number—00b
Payload FEC Enable—1b
Header Frame Check Sequence—0xXXXX (16 bit CRC)
Network Service ID—0x02, Device Info Network Service
Response Opcode—0x04 Ping reply, 0x05 Ping reply from a Left HA, or 0x06 Ping reply for a right HA
Vendor Data Length—0x02 Vendor Data Length
Vendor Data—0xaabb Vendor Data (The format and usage of this field is unique for each vendor.)

TABLE 45

| Size | Frame Desc | Dest Vendor | Dest Device ID (Address) | Src Vendor | Src Device ID (Address) | Seq Num | PFE | Header Frame Check Seq | Net Srv ID | Resp Opcode | VendData Len & Data | Payload Checksum |
|---|---|---|---|---|---|---|---|---|---|---|---|---|
| 0x04 | 00001111b | 001b | 0x123456 | 001b | 0x112233 | 00b | 1b | 0xXXXX | 0x02 | 0x04, 0x05, or 0x06 | 0x02aabb | 0xXXXX |

Size—0x04, Number of bytes in the payload
Frame Descriptor—
  Bit 7—Version=0b
  Bit 6—Embedded Data=0b
  Bit 5—Ack Flag=0b, No Acknowledgement Payload Frame Check Sequence—0xXXXX (16 bit CRC)

The present example protocol includes a Address Info Request/Response. Address Info request PDUs are fixed in size. Table 46 is an Address Info request PDU.

TABLE 46

| Size | Frame Desc | Dest Vendor | Dest Device ID (Address) | Src Vendor | Src Device ID (Address) | Seq Num | PFE | Header Frame Check Seq | Net Service ID | Req Opcode | Payload Checksum |
|---|---|---|---|---|---|---|---|---|---|---|---|
| 0x02 | 00001111b | 001b | 0x112233 | 001b | 0x123456 | 00b | 1b | 0xXXXX | 0x02 | 0x07 | 0xXXXX |

Size=0x02, Number of bytes in the payload
Frame Descriptor—
  Bit 7—Version=0b
  Bit 6—Embedded Data=0b
  Bit 5—Ack Flag=0b, No Acknowledgement
  Bits 4-3—Payload FCS Mode=01, 16-bit length CRC
  Bits 2-0—Frame Type=111b, Extended Protocol
Address—
  Destination Vendor=001b, Organization 1
  Destination Device ID=0x112233, Vendor specific value
  Source Vendor=001b, Organization 1
  Source Device ID=0x123456, Vendor specific value
Sequence Number—00b
Payload FEC Enable—1b
Header Frame Check Sequence—0xXXXX (16 bit CRC)
Network Service ID—0x02, Device Info Network Service
Request Opcode—0x07 Address Info Request
Payload Frame Check Sequence—0xXXXX (16 bit CRC)

Bits 2-0—Frame Type=111b, Extended Protocol
Address—
  Destination Vendor=001b, Organization 1
  Destination Device ID=0x123456, Vendor specific value
  Source Vendor=001b, Organization 1
  Source Device ID=0x112233, Vendor specific value
Sequence Number—00b
Payload FEC Enable—1b
Header Frame Check Sequence—0xXXXX (16 bit CRC)
Network Service ID—0x02, Device Info Network Service
Request Opcode—0x08 Address Info Reply
Addr Info Data—0x010F7FFFFF—address info for this node
Payload Frame Check Sequence—0xXXXX (16 bit CRC)

The present example protocol includes a Extended Device Information Request/Response. Extended Device Information provides a way to retrieve identifying information about a node. Request PDUs are fixed in size. Table 49 is an Address Info request PDU.

TABLE 49

| | | Address | | | | | | | | | |
|---|---|---|---|---|---|---|---|---|---|---|---|
| Size | Frame Desc | Dest Vendor | Dest Device ID | Src Vendor | Src Device ID | Seq Num | PFE | Header Frame Check Seq | Net Service ID | Req Opcode | Payload Check sum |
| 0x02 | 00001111b | 001b | 0x112233 | 001b | 0x123456 | 00b | 1b | 0xXXXX | 0x02 | 0x09 | 0xXXXX |

Address Info response PDUs have a variable size depending on how many addresses are conFIG.d for a node. The minimum size response is 0x05 bytes. This includes the Address Count field as well as the one address that all nodes should have conFIG.d. The format of the Address Info Data is shown in Table 47.

TABLE 47

| | Address Count | Addresses |
|---|---|---|
| Value Description | >=1<br>The number of addresses conFIG.d on this device | 0x0F7FFFFF<br>The list of addresses; size is Address Count * Size of Address |

Table 48 is an Address Info Response with one address assigned.

TABLE 48

| | | Address | | | | | | Header | | | | |
|---|---|---|---|---|---|---|---|---|---|---|---|---|
| Size | Frame Desc | Dest Vendor | Dest Device ID | Src Vendor | Src Device ID | Seq Num | PFE | Frame Check Seq | Net Srv ID | Resp Opcode | Addr Info Data | Payload Check sum |
| 0x07 | 00001111b | 0x01 | 0x123456 | 0x01 | 0x112233 | 00b | 1b | 0xXXXX | 0x02 | 0x08 | 0x010F7FFFFF | 0xXXXX |

Size=0x07, Number of bytes in the payload
Frame Descriptor—
  Bit 7—Version=0b
  Bit 6—Embedded Data=0b
  Bit 5—Ack Flag=0b, No Acknowledgement
  Bits 4-3—Payload FCS Mode=01, 16-bit length CRC Header Frame Check Sequence—0xXXXX (16 bit CRC)
Network Service ID—0x02, Device Info Network Service
Request Opcode—0x09 Extended Device Info Request
Payload Frame Check Sequence—0xXXXX (16 bit CRC)
Table 50 is an Extended Device Info Response.

TABLE 50

| Size | Frame Desc | Address | | | | | | Header | | | Ext | |
|---|---|---|---|---|---|---|---|---|---|---|---|---|
| | | Dest Vendor | Dest Device ID | Src Vendor | Src Device ID | Seq Num | PFE | Frame Check Seq | Net Srv ID | Resp Opcode | Device Info Data | Payload Check sum |
| 0x17 | 00001111b | 001b | 0x123456 | 001b | 0x112233 | 00b | 1b | 0xXXXX | 0x02 | 0x0A | — | 0xXXXX |

Size=0x17, Number of bytes in the payload

Frame Descriptor—
- Bit 7—Version=0b
- Bit 6—Embedded Data=0b
- Bit 5—Ack Flag=0b, No Acknowledgement
- Bits 4-3—Payload FCS Mode=01, 16-bit length CRC
- Bits 2-0—Frame Type=111b, Extended Protocol Address—
- Destination Vendor=001b, Organization 1
- Destination Device ID=0x123456, Vendor specific value
- Source Vendor=001b, Organization 1
- Source Device ID=0x112233, Vendor specific value Sequence Data—00b Payload FEC Enable—1b Header Frame Check Sequence—0xXXXX (16 bit CRC)

Network Service ID—0x02, Device Info Network Service

Response Opcode—0x0A Extended Device Info Reply

Extended Device Info Data—extended device info unique to this node

The Extended Device Info Data has the format shown in Table 51.

TABLE 51

| Field Name | Length (bytes) | Description | Position in Payload |
|---|---|---|---|
| Device Type | 1 | Table 52 | 2 |
| Device Model | 8 | Vendor defined device description | 3–10 |
| Device Serial Number | 8 | Vendor encoded serial number | 11–18 |
| Device Side | 1 | Table 53 | 19 |
| Link MTU | 1 | Largest Receive PDU | 20 |
| Link Options | 1 | Table 54 | 21 |
| Link Audio | 1 | Number of streams supported | 22 |

The Device Type of this node; valid values are show in Table 52.

TABLE 52

| Value | Description |
|---|---|
| 0x01 | Programming Device |
| 0x02 | Hearing Instrument |
| 0x03 | Remote Control |
| 0x04–0xff | Reserved |

The Device Model field is a detailed identifier of the device using a vendor defined encoding scheme; the Device Serial Number is a vendor defined encoding of the device serial number (or part of it); and, the Device Side shows whether this device has been left/right assigned. The valid values for Device Side are shown in Table 53.

TABLE 53

| Device Side Field | |
|---|---|
| Value | Description |
| 0x00 | Unknown |
| 0x01 | Left |
| 0x02 | Right |

The Link MTU field identifies the largest PDU that a node can receive. The Link Options field is a bit field that identifies other options that the node supports. A bit is 1 if the option is supported, 0 if the option is not supported. The options are shown in Table 54.

TABLE 54

| Link Options Field | |
|---|---|
| 7:1 | 0 |
| Reserved | Power Save Support |

The Link Audio field contains the number of audio streams supported by the device. A value of 0 means that no audio streams are supported.

The present example protocol includes a Audio Info Request/Response. Audio Info request PDUs are fixed in size. Table 55 is an Audio Info request PDU.

TABLE 55

| Size | Frame Desc | Address | | | | | | Header Frame Check Seq | Net Service ID | Req Opcode | Payload Check sum |
|---|---|---|---|---|---|---|---|---|---|---|---|
| | | Dest Vendor | Dest Device ID | Src Vendor | Src Device ID | Seq Num | PFE | | | | |
| 0x02 | 00001111b | 001b | 0x112233 | 001b | 0x123456 | 00b | 1b | 0xXXXX | 0x02 | 0x0B | 0xXXXX |

Size=0x02, Number of bytes in the payload
Frame Descriptor—
    Bit 7—Version=0b
    Bit 6—Embedded Data=0b
    Bit 5—Ack Flag=0b, No Acknowledgement
    Bits 4-3—Payload FCS Mode=01, 16-bit length CRC
    Bits 2-0—Frame Type=111b, Extended Protocol
Address—
    Destination Vendor=001b, Organization 1
    Destination Device ID=0x112233, Vendor specific value
    Source Vendor=001b, Organization 1
    Source Device ID=0x123456, Vendor specific value
Sequence Number—00b
Payload FEC Enable—1b
Header Frame Check Sequence—0xXXXX (16 bit CRC)
    Network Service ID—0x02, Device Info Network Service
    Request Opcode—0x0B, Audio Info Request
Payload Frame Check Sequence—0xXXXX (16 bit CRC)

Audio Info response PDUs have a variable size depending on how many audio streams are supported in a node. The minimum size response is 0x01 byte. This includes the Stream Count field with no supported streams. Table 56 demonstrates Audio Info Data field values.

TABLE 56

| Field Name | Length (bytes) | Description | Position in payload |
|---|---|---|---|
| Stream Count | 1 | >=0 | 2 |
| Stream [Codec ID, Bits/Sample, Frequency] | 3 * (Stream Count) | [Codec ID, Bits/Sample, Frequency] Codec IDs are defined in Table 58; Bits/Sample are defined in Table 59; Frequencies are defined in Table 60; | 3 |

Table 57 is an Audio Info Response with two streams supported.

TABLE 57

| | | Address | | | | | | | | | | |
|---|---|---|---|---|---|---|---|---|---|---|---|---|
| Size | Dest Frame Desc | Vendor | Dest Device ID | Src Vendor | Src Device ID | Seq Num | PFE | Header Frame Check Seq | Net Srv ID | Resp Opcode | Audio Info Data | Payload Check sum |
| 0x07 | 00001111b | 001b | 0x123456 | 001b | 0x112233 | 00b | 1b | 0xXXXX | 0x02 | 0x0C | 0x02010111–020305 | 0xXXXX |

Size=0x07, Number of bytes in the payload
Frame Descriptor—
    Bit 7—Version=0b
    Bit 6—Embedded Data=0b
    Bit 5—Ack Flag=0b, No Acknowledgement
    Bits 4-3—Payload FCS Mode=01, 16-bit length CRC
    Bits 2-0—Frame Type=111b, Extended Protocol
Address—
    Destination Vendor=001b, Organization 1
    Destination Device ID=0x123456, Vendor specific value
    Source Vendor=001b, Organization 1
    Source Device ID=0x112233, Vendor specific value
Sequence Number—00b
Payload FEC Enable—1b
Header Frame Check Sequence—0xXXXX (16 bit CRC)
Network Service ID—0x02, Device Info Network Service
Response Opcode—0x0C Audio Info Reply
Audio Info Data—0x02010111020305—audio info for this node; two streams are supported—CVSD Codec, 1 bit/sample @ 64 KHz and μ-Law Codec, 3 bits/sample @ 16 KHz
Payload Frame Check Sequence—0xXXXX (16 bit CRC)

The present example protocol includes a Remote Control Network Service. The remote control network service allows the transfer of information between hearing instruments and a remote control device. The remote control network service is vendor specific and thus does not define any specific requests or responses. All remote control network service data can be sent utilizing the addressing modes defined by a vendor.

The present example protocol includes an FM Control Network Service. The FM control network service allows the transfer of information between accessory devices and FM transceivers, e.g., FM shoes attached to hearing instruments. The FM control network service is vendor specific and thus does not define any specific requests or responses. All FM control network service data can be sent utilizing the addressing modes defined by a vendor.

Identifiers

The present example protocol includes a Codec IDs. Table 58 lists various codec's supported:

TABLE 58

| Codec ID | Description |
|---|---|
| 0x00 | 16-bit Unencoded PCM |
| 0x01 | CVSD |
| 0x02 | μ-Law |
| 0x03–0xFE | Reserved |
| 0xFF | Reserved |

Note that additional coding types are assigned as needed.

The present example protocol includes a Bit Rate IDs. Table 59 lists various Bit Rate IDs supported.

TABLE 59

| Bit Rate ID | Description |
| --- | --- |
| 0x00 | Reserved |
| 0x01 | 1 bit/sample |
| 0x02 | 2 bits/sample |
| 0x03 | 3 bits/sample |
| 0x04 | 4 bits/sample |
| 0x05 | 5 bits/sample |
| 0x06 | 6 bits/sample |
| 0x07 | 7 bits/sample |
| 0x08 | 8 bits/sample |
| 0x09 | 9 bits/sample |
| 0x0A | 10 bits/sample |
| 0x0B | 11 bits/sample |
| 0x0C | 12 bits/sample |
| 0x0D–0xFE | Reserved |
| 0xFF | Reserved |

Note that additional bit rates are assigned as needed.

The present example protocol includes a Sampling Frequency IDs. Table 60 lists various sampling frequencies supported:

TABLE 60

| Sampling Frequency ID | Description |
| --- | --- |
| 0x00 | 8 KHz |
| 0x01 | 10 KHz |
| 0x02 | 12 KHz |
| 0x03 | 14 KHz |
| 0x04 | 15 KHz |
| 0x05 | 16 KHz |
| 0x06 | 18 KHz |
| 0x07 | 20 KHz |
| 0x08 | 22.05 KHz |
| 0x09 | 24 KHz |
| 0x0A | 26 KHz |
| 0x0B | 28 KHz |
| 0x0C | 30 KHz |
| 0x0D | 32 KHz |
| 0x0E | 44.1 KHz |
| 0x0F | 48 KHz |
| 0x10 | 56 KHz |
| 0x11 | 64 KHz |
| 0x12–0xFE | Reserved |
| 0xFF | Reserved |

Note that additional sampling frequencies are assigned as needed.

High Level Protocol

Hearing instruments (HI) with wireless communication requires that HI firmware developers consider factors that were not present for wired communication. This document will briefly describe some of the design factors of the wireless communication channel.

A wired HI communicates "point-to-point" when it is involved in communication across its wire; it acts as a "slave" to the "master" device attached at the other end of the wire. The point-to-point relationship is the result of the wired connection, and the master/slave relationship is a result of the protocol (SDA or SSI) used to transfer the data. The master initiates all communications and the slave responds synchronously. This is the mechanism generally used by "programmers."

HI with a wireless link are not limited by the point-to-point or master/slave relationship. When a wireless message is transmitted, it is available for any device with a compatible radio to receive. Because of this, any device can initiate communication with any other device in range. This "peer-to-peer" relationship opens up the possibility for HI to communicate with another HI or with accessory devices. In one embodiment the high level protocols supported on the wireless link include, but are not limited to: Hearing Aid Control; One-way streaming audio; Bidirectional streaming audio; and Extended.

The Hearing Aid Control protocol is the primary mechanism to move data between a HI and a fitting application or an accessory device or another HI.

The One-way Streaming Audio protocol is used to transmit digital audio to a HI. When this protocol is active in a HI, the HI cannot transmit any data.

The Bidirectional Streaming Audio protocol is used to transmit and receive digital audio between a HI and an audio gateway. When this protocol is active in a HI, the HI can only send to the audio gateway. The data that can be sent is digital audio or a small amount of embedded control data.

The Extended protocol is used to provide additional network services. These services include device discovery, dynamic address assignment, and device info retrieval.

In one embodiment, when one of the streaming audio protocols is active (i.e. a "session" is active), attempting to use any other protocol (hearing aid control, extended or the other streaming audio) will terminate the streaming audio session.

When using the Hearing Aid Control protocol, a message can be sent either with or without lower layer acknowledgments (ack). A lower layer ack signifies that a message was received and delivered to the destination application for processing. It does NOT signify that the message was actually processed by the receiving application.

If a lower layer ack is used, several attempts will be made to delivery the message to the destination. If the lower layer is not able to deliver the message, the sending application will be notified of the delivery failure. If the lower layer was able to deliver the message, the sending application will be notified of the successful delivery. The lower layer ack mechanism ensures that no duplicates are sent.

If the lower layer ack is not sent, the delivery of the message will be attempted. If the message was transmitted, the sending application will be notified that it was successfully sent. This notification does NOT mean that the destination received the message. If the sender was not able to transmit the message, the sending application is notified of the failure.

When choosing whether to use the link layer ack or not, the application developer has several options to consider. These include:

Does the message require a reply from the receiving application?

If the receiving application is expected to reply, that can be used as an application level ack instead of link layer acks. This does require that the application do its own timeout and retry processing. The protocol would provide no support for that other than making sure the message was actually transmitted.

Using a link layer ack when a expecting an application reply would put more data traffic on the network. However, it would eliminate the need for the application to perform timeout and retry processing.

Does it matter if the message arrives at the destination?

If it does not matter if the message arrives, then not using the link layer ack would be the most efficient from a power perspective. The assumption is that the communication channel is "sufficiently" good that, in most cases, the message will be delivered. Another assumption is that delivery failure will not impact HI functionality in any significant way (i.e. the wearer would not notice a difference) or that the message is a periodic update that will get through when it is sent the next time.

If the message must get to the destination and no application reply is expected, then a link layer ack is probably most appropriate.

In one embodiment, the Hearing Aid Control protocol is capable of carrying 1024 bytes of application data. There are several tradeoffs that can be made when selecting the amount of data to put in one packet. For example, with a larger packet, there is a greater chance that corrupted bits cannot be corrected. Much of this depends on the link quality (specifically BER); link quality is affected by the radio design, distance between communicating devices, and external "interferers". The benefit of larger packets is that the overall throughput of the network link will be greater because there is less protocol overhead.

One disadvantage of smaller packets is that if the application message is larger than the packet, the application must provide its own mechanism to segment and reassemble the application message. For example, assume that a 256 byte SSI buffer is being transmitted from a fitting application to a HI. If each packet contained 100 bytes of payload, three packets would have to be sent. In addition, information must be included in the message so that the receiver can tell if one of the packets was not received.

For the Audio Streaming protocols, all application messages have to fit within the embedded data area. The embedded data area is 25 bits; 3-bits are used to define the embedded message type. The other 22 bits are dependent on the embedded message type. One mode is reserved for WAC-to-HI communication. The other modes are not defined at this time and are available for use. The source and destination of the embedded message are fixed because the Audio Streaming protocols create dedicated sessions between two devices.

Quality of Service (QOS) refers to things like latency and reliability in sending a message. Certain embodiments of the wireless protocol do not guarantee of message delivery. Using the link layer ack does not provide that guarantee because the ack algorithm will eventually give up. In addition, the actual BER will have an impact as described in previous sections. The Streaming Audio protocols do not follow the same rules as the Hearing Aid Control Protocol; so, they are not considered in this discussion except to discuss the delay for embedded data.

In one embodiment, the Hearing Aid Control protocol uses the CSMA algorithm to determine if the wireless channel is available. A sending HA could wait up to 320 milliseconds waiting for the channel to become available; this time delay accommodates "interferers". In addition to CSMA, there are two cases to consider: using a link layer ack and not using a link layer ack.

If a link layer ack is not used, the maximum delay before transmission or failure is the CSMA delay of 320 milliseconds.

If a link layer ack is used, the sender retries up to 3 times until the destination acks the packet. After each transmission, the sender will timeout in 100 ms. The worst case delay before success or failure is 1680 ms.

$$((\# \text{ of transmissions})*(\text{CSMA timeout}))+((\# \text{ of timeouts})*(\text{timeout duration}))=(4*320 \text{ ms})+(4*100 \text{ ms})=1280 \text{ ms}+400 \text{ ms}=1680 \text{ ms}$$

For ear-to-ear messages, an additional 250 ms could be added to the worst case delay. This is for the node wakeup sequence which may be needed if the destination device is expected to be asleep.

Wireless Hearing Aid Control Protocol Example

One possible application of the proposed system is for the control of hearing aids using the wireless protocol. The following is only one suggestion for performing such controls. It is understood that variations in functions, process, coding, and control may be made using the wireless protocol and without departing from the scope of the present subject matter.

The proposed use of the wireless protocol can convey remote command and control information between two hearing instruments as well as between an interface 110, such as a WAC device, and the hearing instruments. Information such as volume settings, mute states, battery life remaining, acoustic environment, microphone status, etc. can be conveyed for the purpose of controlling the hearing instruments, synchronizing them, or providing user feedback. All of which make the hearing instrument a more effective listening device for both wireless inputs, acoustic inputs, or a combination thereof.

Remote control information is useful to control the various audio sources during a wireless audio session. For this reason, it is advantageous to send information embedded with the streaming audio data for the purpose of listener comfort and listener preferences.

According to one embodiment, for the purpose of command and control of the hearing instruments, there are six data types defined and one reserved for later expansion. Two data types are specific to the embedded channel but may also be used in a normal data payload message as well. The wireless protocol includes a packet having a 60 bit header including a CRC-16 cyclic redundancy code encoded using a RS(15,11) Forward error correction. This header preceeds a variable length amount of payload bits that may or may not be encoded using RS(15,11). The payload may also include a CRC check as appropriate for the type of data being sent.

Information useful for the remote control of a hearing instrument may be contained within a packet header of the wireless protocol example provided herein. The source address field within the digital audio packet may be replaced from time to time with useful telemetry information that may be conveyed to and from a hearing instrument for the purpose of audio control. One reason for this is that during a streaming or bidirectional audio session, the payload bits are consumed with passing digital audio information and no bandwidth is available for such things as telemetry. Further, the payload may or may not be protected by a CRC code or Reed-Solomon forward error correction. For this reason it was determined that audio control information could be contained in the header in place of the usual source address (device ID), which during streaming has no particular relevance to the receiving station. This is referred to as embedded data. The source address consists of a 3-bit vendor ID plus a pre-assigned 22 bit device ID and will be replaced when embedded data is present to provide 25 bits of control and status information that can be conveyed reliably during but not limited to a streaming audio session.

These messages will be sent via the Wireless Protocol and be contained in the Wireless header PDU as an embedded data type which is indicated by BIT 6 being set within the frame descriptor (FD) field of the header PDU. The message is then located in the Embedded channel (EC) field within the header PDU.

This message type can also be sent in the payload of a normal wireless packet and is identified by the extended data type within the Protocol identifier bits of the frame descriptor (FD) field of the header PDU. The extended data type is the first payload byte following the header PDU checksum. The service id is 0x03 indicating a remote control message. This service id is then followed by the actual remote control message as defined herein.

The message will be somewhat generic and extensible. The first three bits of the message will be reserved for message type which can range from 0 to 7 with 7 being reserved for extended message types. The remaining bits will be considered payload bits within the remote control message type. At the time of this document, two message types have been identified. Their size has been limited for use in the embedded channel but there use is not limited to the embedded channel and can be used during a normal exchange of telemetry information over the regular payload message channel.

TABLE 61

| Generic remote control message | |
| --- | --- |
| Message type | Payload area |
| 3 bits | XXX bits |

TABLE 62

Remote control message as embedded data within a streaming audio header PDU

| | | Address | | | | | | | | |
| --- | --- | --- | --- | --- | --- | --- | --- | --- | --- | --- |
| Size | Frame Desc | Dest Vendor | Dest Device ID | Remote Control message (Embedded Data) | Seq Num | PFE | Header Frame Check Seq | Embedded Data | Payload | Payload Check sum |
| 0x205 | 0X04 | 0x01 | 0x12345 | 0x123456 | 00b | 1b | 0xXXXX | 1 | 0xXXXX | 0xXXXX |

Two examples are shown in the tables below. Table 62 shows the remote control message as embedded data within the header PDU. Table 63 shows the command message as part of the payload of a net-service ID type 0x03 (Remote control) payload of an extended data type (FD).

TABLE 63

Remote control message within the payload of an extended frame descriptor type packet.

| | | Address | | | | | | Header | | | |
| --- | --- | --- | --- | --- | --- | --- | --- | --- | --- | --- | --- |
| Size | Frame Desc | Dest Vendor | Dest Device ID | Source Vendor | Source ID | Seq Num | PFE | Frame Check Seq | Net Service ID | Remote Control message | Payload Checksum |
| 0x8 | 00001111b | 0x01 | 0x112233 | 0x01 | 0x123456 | 1b | 1b | 0xXXXX | 0x03 | 0xXXX | 0xXXXX |

The message type 0 is an embedded command message which in one embodiment is no more than 25 bits long and is bit mapped as shown in Table 64 below

TABLE 64

| Embedded command message type 0. | | | | | | | | | |
| --- | --- | --- | --- | --- | --- | --- | --- | --- | --- |
| Type 0 | Volume Change | Volume level | Memory Inc | Memory State | Mute State | Courtesy-tone | Status Request | RF channel | Rsvd |
| Bits 0–2 | Bits 3–4 | Bits 5–9 | Bit 10 | Bits 11–13 | Bits 14–15 | Bits 16–17 | Bit 18 | Bits 19–21 | Bit 22–24 |

The payload bits for this message are as follows.
Volume change Volume is a relative setting in this message
Bit 3 indicates an incremental change in volume.
Bit 4 indicates the direction of change 1=increase volume 0=decrease Volume Level
Bits 5-9
0 indicate no change to volume
1=Minimum
31=Maximum
Memory Increment
Bit 10 indicates a change in memory selection a one on this bit indicates to the hearing instrument to increment the memory selection by one until modulo memory select wraps to 1(zero+1). Zero is invalid.
Memory State there are up to seven different memory settings
Bit 11-13

0 = No change to memory state
1 = memory 1
⋮
7 = memory 7

Mute State
Bit 6 indicates a change in the mute state. There are three mute states as indicated in the Midfrequency audio control document. So these are incremented modulo 3 from 0-2. The states are as follows.
0=Hearing instrument microphone only (Wireless muted).
1=Wireless input only (Hearing instrument microphone muted).
2=Wireless and Hearing instrument microphone blended (un-muted).
Courtesy-Tone
Bit 7 and 8 are used for courtesy tones
Four different audio indicators are available and can be enabled via these bits. These tones are locally generated on the hearing instrument.
00=disable tone
01=ring-tone for incoming call
10=Low WAC battery indication
11=WAC within range
Status Request
When this bit is set a status message is being requested. The hearing instrument cannot respond to this request when in the hi-fidelity streaming audio mode.
Note that absolute settings for volume and memory will take precedence over relative increments or decrements contained within the same message.
RF channel
Selects an RF channel when set to zero, no change should be made to the preset RF channel. The receiving station will change channels if the presently tuned channel is not the one being sent in this field if it is non-zero.
Bits 19-21
Channels 1-6
Table 65 shows the bits of a message type 1:

TABLE 65

| | | | | Status Reply message type 1. | | | | |
|---|---|---|---|---|---|---|---|---|
| Type 1 | Volume | Memory | Mute | Battery | Mic status | Environment | Reserved |
| Bits 0–2 | Bits 3–7 | Bits 8–10 | Bits 11–12 | Bits 13–16 | Bits 17–19 | Bits 20–22 | Bits 23–24 |

The payload bits for this message are be as follows
Volume Status
Bit 3-7 Indicates current volume setting of hearing instrument
1=lowest volume setting
31=highest volume setting
Note that zero is invalid
Memory Status
Bit 8-10 Indicates memory setting 1 = Memory 1
⋮
7 = Memory 7

Note that zero is invalid.
Mute Status
Bit 11-12 Indicates present mute condition
0=Mic and Wireless input enabled
1=Mic enabled/Wireless input disabled
2=Mic disabled/Wireless input enabled
3=Both Mic and Wireless inputs disabled
Battery Status
Bit 13-16 Indicates battery status 0 = Battery empty
⋮
15 = Battery Full 15=Battery Full
Microphone Selection
Bit 17-18 Indicates present microphone setting
0=Omni
1=Cardioid
2=Super Cardioid
3=Reserved1
Environment Status
Bit 20-22 Indicates present environmental conditions
0=No input
1=Speech input only
2=Noise without speech
3=Noise with speech
4=Periodic noise
5=Music
6=Reserved1
7=Reserved2
Reserved
Bit 23-24

Transceiver Hardware

A number of transmitter and receiver combinations can be used to perform the wireless communications between interface 110 and wireless audio devices. One such architecture is provided herein, however, it is understood that variations may be made without departing from the scope of the present subject matter.

In one embodiment, the transceiver is a mixed signal ASIC for use with hearing aids to enable wireless transfer of settings information between right and left hearing aids and transfer of bi-directional voice, monaural, and diotic one-way audio, and bi-directional programming data between a wireless device and hearing aids. In one embodiment it uses 300 KHz channels in unlicensed frequency bands over about 700 MHz. The ASIC includes a frequency synthesizer, transmit and receive RF circuitry, a MAC for performing bit and frame synchronization, transmit and receive control and other digital functions, and a serial interface to a companion hearing aid.

The transceiver will transmit and receive GFSK modulated digital data over one 300 KHz wide channel by time division multiplexing in one embodiment. Other transmission embodiments are possible without departing from the scope of the present subject matter. The channel frequency and other features will be configurable via registers that must be programmed over an SSI port. Register programming will allow selective shut-down of the IC to conserve power. Clear channel assignment (CCA) will include an RSSI level for the the currently programmed receiver channel and digitized with a successive approximation analog to digital converter. The received and transmitted data will be handled by a MAC.

In one embodiment, the transceiver must be capable of tuning to a predetermined group of six channels each spaced 606 KHz apart. The transmitter is made up of a Gaussian filter, a Voltage controlled Oscillator (VCO), and a Power Amplifier (PA). The data to be transmitted is output to a single bit D to A converter of which the output is applied to a gaussian filter with a bandwidth≈300 KHz. This signal is summed with the loop filter voltage of a PLL and then applied to the input to the VCO. The loop filter of the PLL which drives the VCO in normal operation is momentarily opened during transmit so that the PLL loop will not attempt to track out the voltage applied from the Gaussian filter output that contains the modulated data. The VCO is thereby frequency modulated with a frequency deviation of +/−46.545 KHz. The modulation type is Gaussian Continuous Phase 2FSK with Bt=0.5. The modulation index is controlled by setting the gain on the modulated signal applied to the VCO. The VCO has a Kv on the order of 10 MHz/v thus a signal of approximately 4.6 mvp-p is required to achieve the specified frequency deviation. This gain parameter (modulation index) must be trimmed in final production at various frequencies of operation to achieve the specified frequency deviation.

The modulated signal is applied to the Power amplifier which has programmable power output settings that are controllable through a register that controls the bias current over a range from 100 to 1500 uA in 100 uA steps. The frequency range is tunable from greater than about 700 MHz to about 965 MHz. This covers the mid frequency ISM band for most countries of the world.

Those of skill in the art will readily appreciate that other embodiments of transceivers may be used without departing from the scope of the present subject matter.

Although specific embodiments have been illustrated and described herein, it will be appreciated by those of ordinary skill in the art that other embodiments are possible without departing from the scope of the present subject matter.

What is claimed is:

1. A system for wireless communications of information between a remote source and a plurality of wearers of hearing aids, comprising:
    a plurality of hearing aids each having a radio receiver for reception of packetized communications, the packetized communications including a packet header and a payload including data, the packet header comprising information identifying certain bits as control bits and providing control via the control bits to control at least one of the plurality of hearing aids and the payload including audio information; and
    an apparatus comprising a wireless interface including a first port adapted to receive the information from the remote source, and a second port adapted to wirelessly communicate the information in a packetized format to the plurality of hearing aids, the wireless interface including digital electronics to provide a plurality of programmable transmission modes,
    wherein the system includes a plurality of nodes having each a unique address; the nodes associated with each of the plurality of hearing aids and the apparatus, the system providing programmable communications between at least two nodes of the plurality of nodes using the transmission modes, the system providing control and audio information in a single packet and the system configured to provide packetized communications encoded for a right hearing aid and a left hearing aid for at least one wearer, the right hearing aid and left hearing aid each having different addresses and each able to receive different audio information.

2. The system of claim 1, wherein the wireless interface is adapted to transmit streaming audio.

3. The system of claim 2, wherein the streaming audio is stereo audio.

4. The system of claim 1, wherein the plurality of hearing aids are programmable to play a right or left sound of stereo audio information.

5. The system of claim 1, wherein the digital electronics support a unicast mode for transmissions to a specific hearing assistance device of the plurality of hearing aids.

6. The system of claim 1, wherein the digital electronics support a multicast mode for transmissions to a specific plurality of hearing aids of the plurality of hearing aids.

7. The system of claim 1, wherein the digital electronics support a broadcast mode for transmissions to the plurality of hearing aids.

8. The system of claim 1, wherein the first port receives the information over a wired connection.

9. The system of claim 1, wherein the first port receives the information over a wireless connection.

10. The system of claim 9, wherein the first port is adapted for communications compatible with the BLUETOOTH protocol.

11. The system of claim 9, wherein the first port is adapted for code division multiple access (CDMA) communications.

12. The system of claim 9, wherein the first port is adapted for global system for mobile (GSM) communications.

13. The system of claim 9, wherein the first port is adapted for ultra-wideband (UWB) communications.

14. The system of claim 1, wherein the first port supports optical communications.

15. The system of claim 1, wherein the first port supports ultrasonic communications.

16. The system of claim 1, wherein the second port is adapted for communications compatible with the BLUETOOTH protocol.

17. The system of claim 1, wherein the second port is adapted for code division multiple access (CDMA) communications.

18. The system of claim 1, wherein the second port is adapted for global system for mobile (GSM) communications.

19. The system of claim 1, wherein the second port is adapted for ultra-wideband (UWB) communications.

20. The system of claim 1, wherein the second port is adapted for optical communications.

21. The system of claim 1, wherein the second port is adapted for carrier sense multiple access (CSMA) communications.

22. The system of claim 1, wherein the plurality of hearing aids include behind-the-ear hearing aids.

23. The system of claim 1, wherein the plurality of hearing aids include in-the-ear hearing aids.

24. The system of claim 1, wherein the plurality of hearing aids include completely-in-the-canal hearing aids.

25. The system of claim 1, wherein the second port includes a first transmitter and a second transmitter for transmitting stereo forms of information.

26. The system of claim 1, wherein the interface includes a carrier sense multiple access (CSMA) transmission system.

27. The system of claim 1, wherein the plurality of hearing aids are adapted to transmit signals to the wireless interface.

* * * * *